(12) United States Patent
Miller et al.

(10) Patent No.: US 12,496,775 B2
(45) Date of Patent: Dec. 16, 2025

(54) METHODS OF FABRICATING LASER-SINTERED CARBOHYDRATE MATERIALS AND COMPOSITIONS AND USES THEREOF

(71) Applicant: William Marsh Rice University, Houston, TX (US)

(72) Inventors: Jordan S. Miller, Houston, TX (US); Ian S. Kinstlinger, Houston, TX (US)

(73) Assignee: William Marsh Rice University, Houston, TX (US)

( * ) Notice: Subject to any disclaimer, the term of this patent is extended or adjusted under 35 U.S.C. 154(b) by 99 days.

(21) Appl. No.: 17/999,146

(22) PCT Filed: May 21, 2021

(86) PCT No.: PCT/US2021/033763
§ 371 (c)(1),
(2) Date: Nov. 17, 2022

(87) PCT Pub. No.: WO2021/237163
PCT Pub. Date: Nov. 25, 2021

(65) Prior Publication Data
US 2023/0219289 A1    Jul. 13, 2023

Related U.S. Application Data

(60) Provisional application No. 63/029,241, filed on May 22, 2020.

(51) Int. Cl.
*C08L 5/00* (2006.01)
*B29C 41/00* (2006.01)
*B29C 64/118* (2017.01)
*B29C 64/153* (2017.01)
*B29C 64/268* (2017.01)
*B29C 64/30* (2017.01)
*C08L 5/02* (2006.01)

(52) U.S. Cl.
CPC .......... *B29C 64/153* (2017.08); *B29C 41/003* (2013.01); *B29C 64/118* (2017.08); *B29C 64/268* (2017.08); *B29C 64/30* (2017.08)

(58) Field of Classification Search
CPC ................................... C08L 5/00; C08L 5/02
USPC ......................................... 106/162.1, 205.01
See application file for complete search history.

(56) References Cited

U.S. PATENT DOCUMENTS 4,863,538 A    9/1989    Deckard
9,452,239 B2   9/2016    West et al.
(Continued)

OTHER PUBLICATIONS

Miller, Jordan S. et al. "Rapid casting of patterned vascular networks for perfusable engineered three-dimensional tissues", Nature Materials, vol. 11, No. 9, Jul. 1, 2012 (Jul. 1, 2012), p. 768-774, XP055248488 (13 pages).
(Continued)

*Primary Examiner* — Leo B Tentoni
(74) *Attorney, Agent, or Firm* — Osha Bergman Watanabe & Burton LLP

(57) ABSTRACT

A composition useful in forming a structure in the form of a substantially interconnected vascular network. The composition includes a powder including a carbohydrate powder and an anti-caking agent, where the powder: has a granular form, and has a specific energy of less than 6 millijoules per milliliter (mJ/mL).

10 Claims, 31 Drawing Sheets

(56) References Cited

U.S. PATENT DOCUMENTS

| | | | | |
|---|---|---|---|---|
| 2005/0059757 A1* | 3/2005 | Bredt | ................ | B33Y 70/10 |
| | | | | 106/443 |
| 2017/0151727 A1* | 6/2017 | Ederer | ................ | B29C 64/153 |
| 2017/0196666 A1* | 7/2017 | Böhm | ................ | A61C 13/0019 |
| 2020/0315973 A1* | 10/2020 | Di Renzo | ............ | A61K 31/498 |

OTHER PUBLICATIONS

Bellan, Leon M. "Fabrication of an artificial 3-dimensional vascular network using sacrificial sugar structures" Apr. 7, 2009 (Apr. 7, 2009), p. 1354-1357, Retrieved from the Internet: <URL:https://pubs.rsc.org/en/content/articlepdf/2009/sm/b819905a>, XP055835629 (5 pages).

Lewis, Jennifer A. et al. "Direct writing in three dimensions", Materials Today, Elsevier, Amsterdam, NL, vol. 7, No. 7-8, Jul. 1, 2004 (Jul. 1, 2004), p. 32-39, XP004599993 (8 pages).

International Search Report issued in International Application No. PCT/US2021/033763 dated Sep. 14, 2021 (3 pages).

Written Opinion issued in International Application No. PCT/US2021/033763 dated Sep. 14, 2021 (7 pages).

Office Action issued in counterpart Japanese Patent Application No. 2022-571206 mailed on Jul. 9, 2024 (5 pages).

Office Action issued in counterpart Japanese Patent Application No. 2022-5712106 mailed on Feb. 27, 2024 (6 pages).

Office Action issued in counterpart Canadian Patent Application No. 3,174,427 mailed on Mar. 4, 2024 (5 pages).

Office Action issued in corresponding European Patent Application No. 21734587.5, mailed on Nov. 25, 2024 (9 pages).

Kinstlinger, I.S., Saxton, S.H., Calderon, G.A. et al. "Generation of model tissues with dendritic vascular networks via sacrificial laser-sintered carbohydrate templates." Nat Biomed Eng 4, 916-932, 2020 (17 pages).

Bertassoni, L. E. et al., Hydrogel Bioprinted Microchannel Networks for Vascularization of Tissue Engineering Constructs, 2014, 2202-2211, 14(13), Lab Chip.

Kolesky, D. B., Homan, K. A., Skylar-Scott, M. A., & Lewis, J. A., Three-Dimensional Bioprinting of Thick Vascularized Tissues, 2016, 3179-3184, 113(12), 201521342, Proceedings of the National Academy of Sciences.

Kolesky, D. B., Truby, R. L., Gladman, A. S., Busbee, T. A., Homan, K. A., & Lewis, J. A., 3D Bioprinting of Vascularized, Heterogeneous Cell-Laden Tissue Constructs, 2014, 3124-3130, 26(19), Advanced Materials.

Feugier, F. G., Mochizuki, A., & Iwasa, Y., Self-Organization of The Vascular System Inplant Leaves: Inter-Dependent Dynamics Ofauxin Flux and Carrier Proteins, 2005, 366-375, 236(4), Journal of Theoretical Biology.

Fujita, H., & Mochizuki, A., The Origin of the Diversity of Leaf Venation Pattern, 2006, 2710-2721, 235(10), Developmental Dynamics.

Runions, A., Lane, B., & Prusinkiewicz, P., Modeling Trees with a Space ColonizationNatural Phenomena.

* cited by examiner

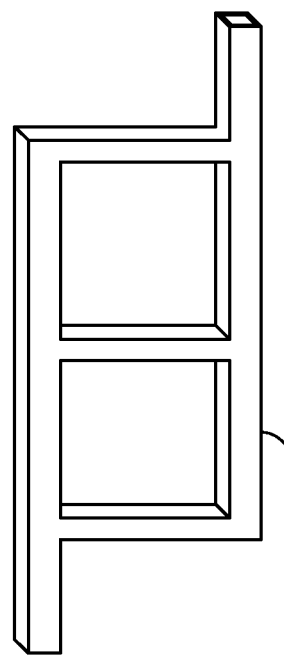
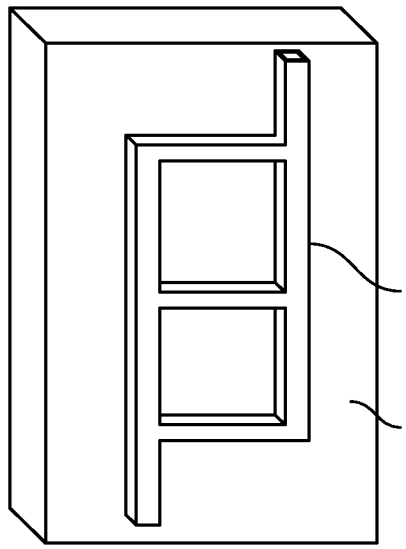
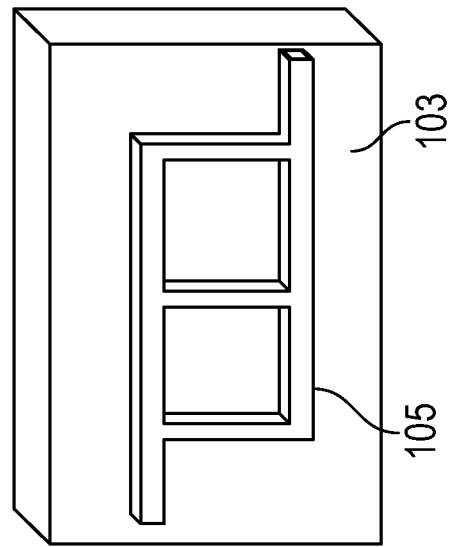
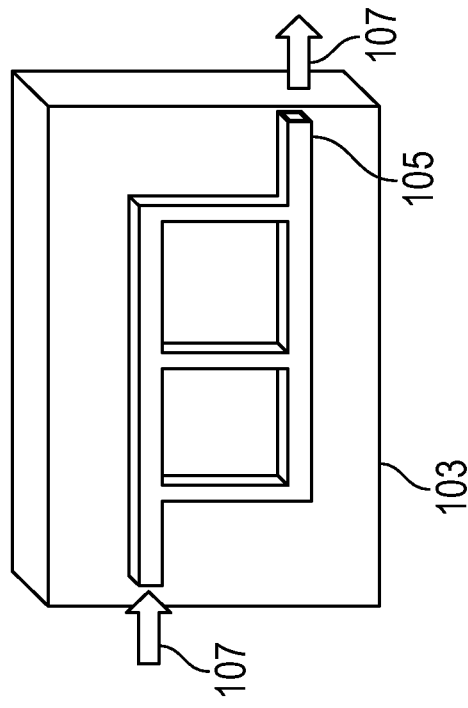
FIG. 1A (Prior Art)
FIG. 1B (Prior Art)
FIG. 1C (Prior Art)
FIG. 1D (Prior Art)

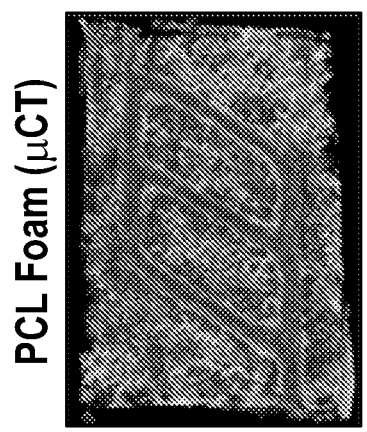
FIG. 12A PCL Foam (μCT)
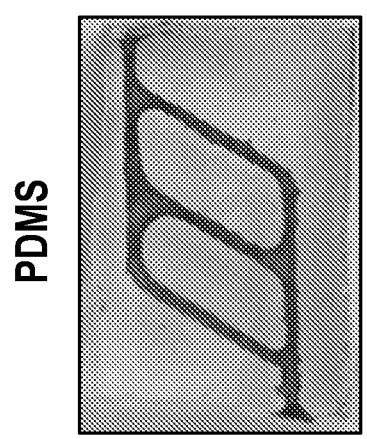
FIG. 12B PDMS
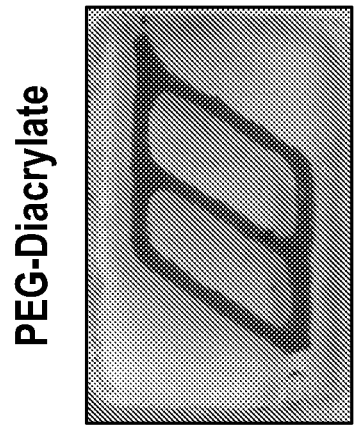
FIG. 12C PEG-Diacrylate
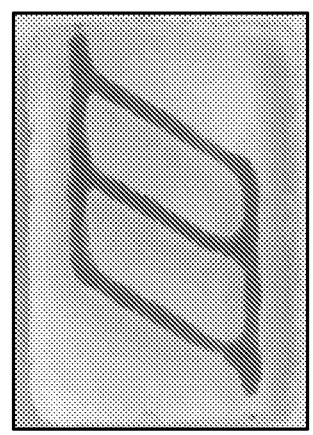
FIG. 12D Agarose
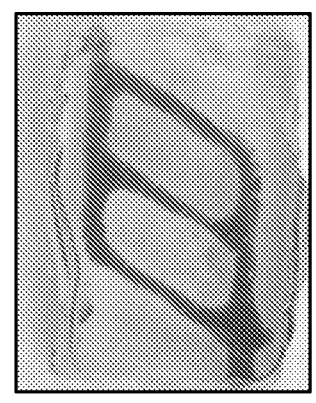
FIG. 12E Silk Fibroin
FIG. 12F Fibrin

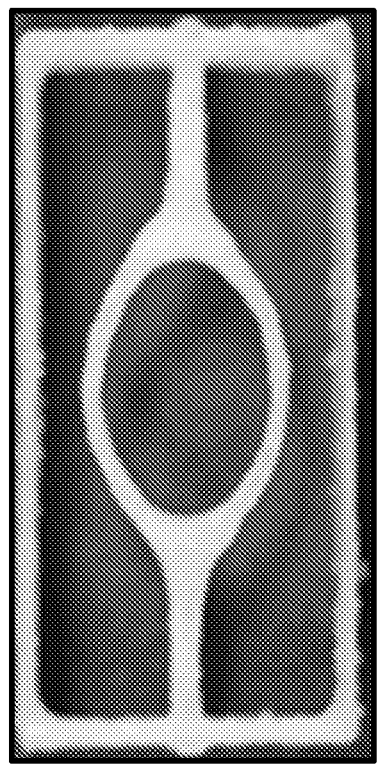
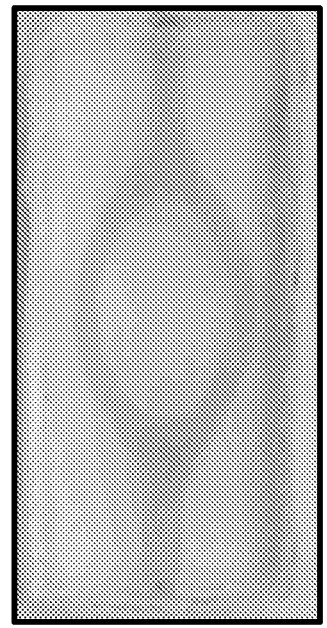
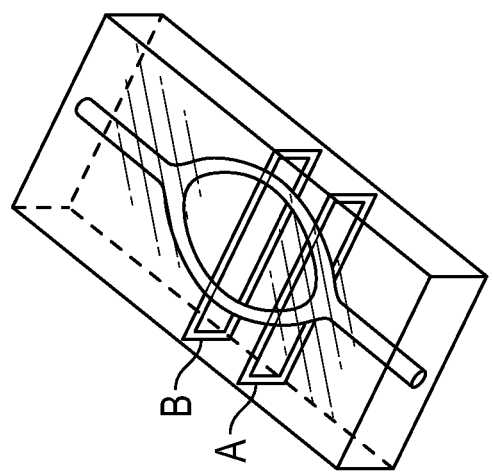
FIG. 13B
FIG. 13C
FIG. 13A

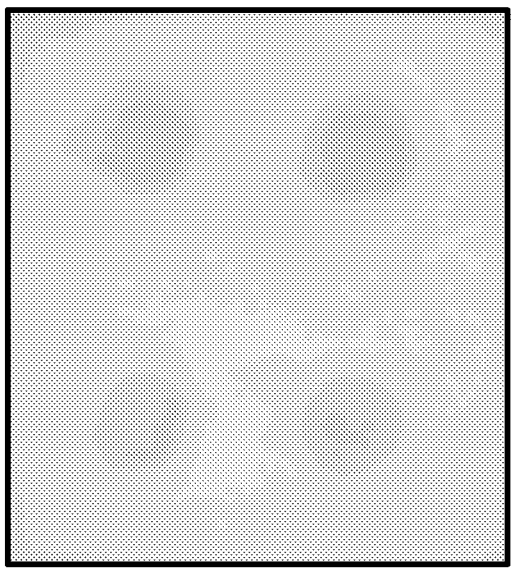
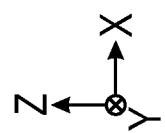
FIG. 14E
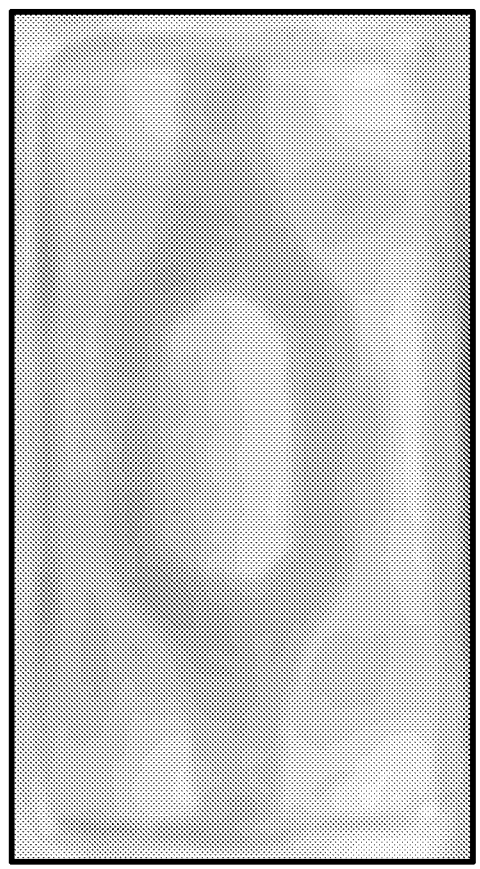
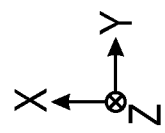
FIG. 14D

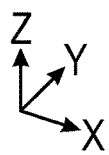
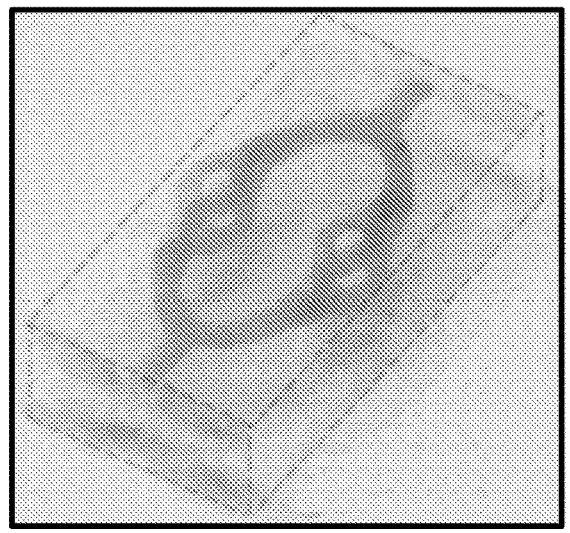
FIG. 15D
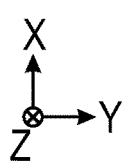
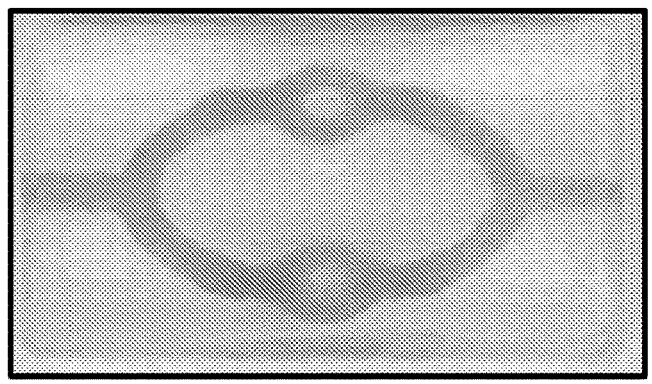
FIG. 15E
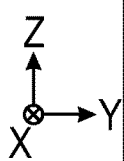
FIG. 15F

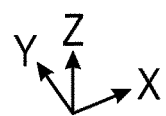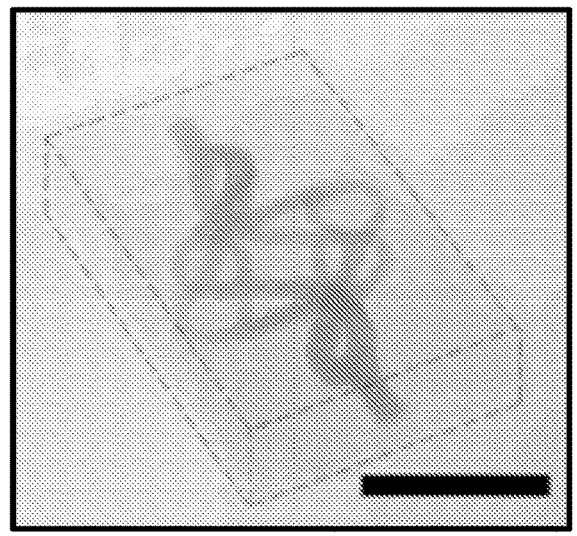
FIG. 16D
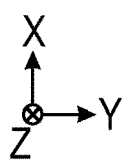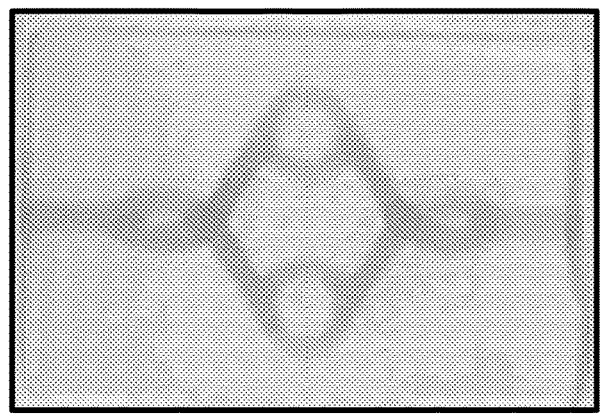
FIG. 16E
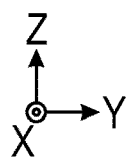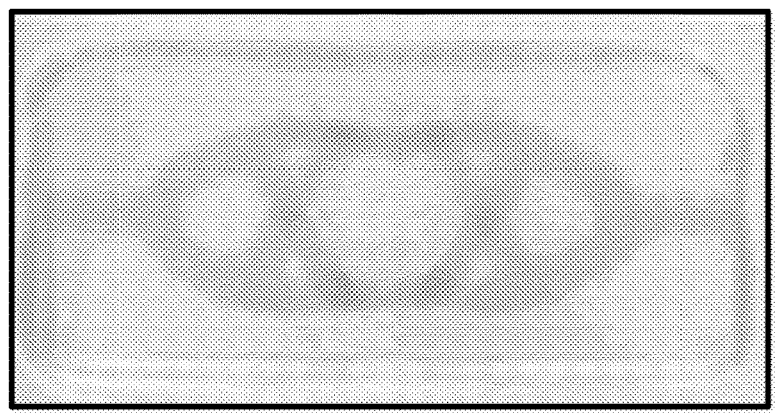
FIG. 16F

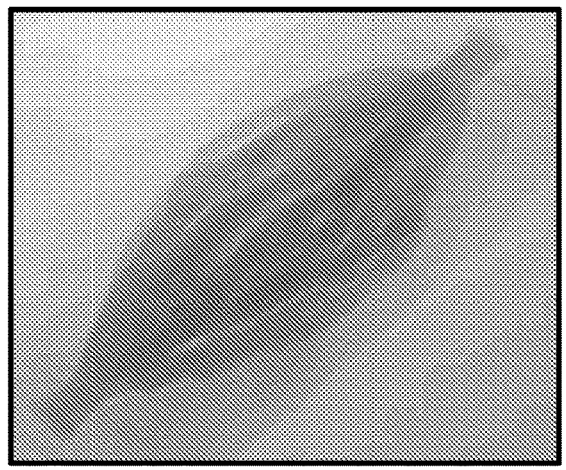
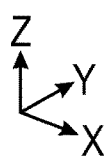
FIG. 21E
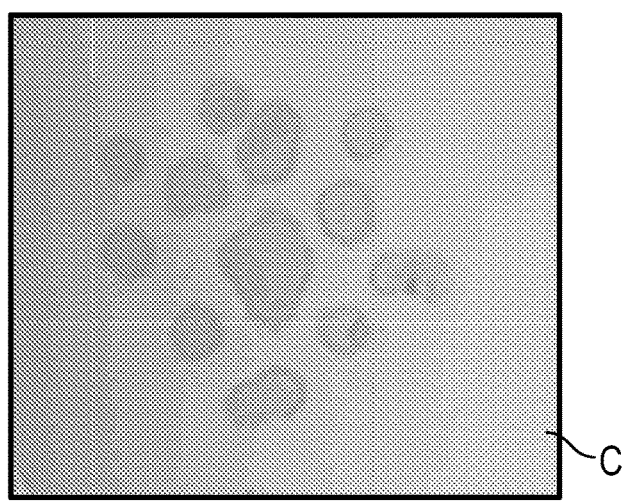
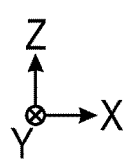
FIG. 21F
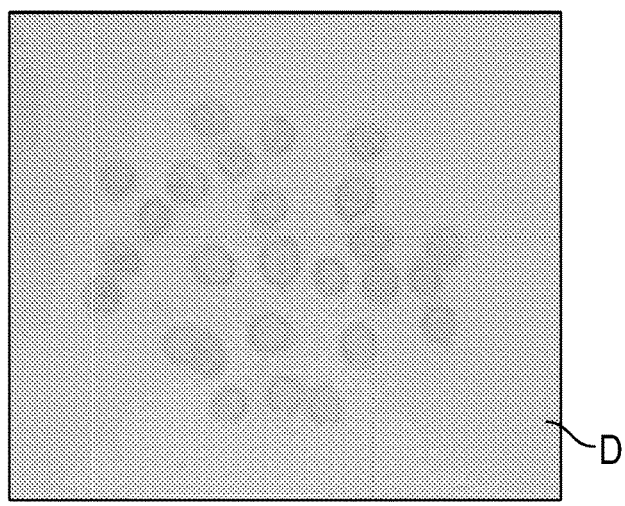
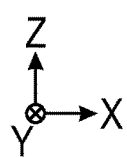
FIG. 21G

METHODS OF FABRICATING LASER-SINTERED CARBOHYDRATE MATERIALS AND COMPOSITIONS AND USES THEREOF

CROSS-REFERENCE TO RELATED APPLICATIONS

This application claims priority from Application 63/029,241 filed on May 22, 2020 in the United States.

STATEMENT REGARDING FEDERALLY SPONSORED RESEARCH

This invention was made with government support under Grant No. F31 HL140905 awarded by the National Institutes of Health. The government has certain rights in the invention.

BACKGROUND OF THE INVENTION

The ultimate goal of the field of tissue engineering is the creation of patient-specific artificial organs that restore function to diseased or injured patients. Over the past two decades, momentous advances in biomaterials and cell/tissue biology have led to several key clinical successes in the field. Engineered thin, avascular tissues, such as skin, cornea, and bladder, have been implanted in patients with excellent functional recovery. Large-scale solid organs, however, represent a much greater challenge to engineer due to their exquisitely complex internal fluidic networks (i.e., vasculature). Convective transport of oxygen and nutrients through the vasculature is essential for survival and function of cells occupying the interior of large engineered tissues. In the absence of nutrient transport through the vasculature, tissues thicker than several hundred microns will rapidly develop a necrotic core. Therefore, many researchers have devoted substantial effort to engineering artificial tissue constructs containing open internal voids or channels to facilitate convective transport.

Several paradigms have emerged for the creation of tissue scaffolds with enhanced potential for convective transport. In a widely-used strategy, cells of interest are seeded in a hydrogel composed of a polymeric biomaterial along with temporary particles or dissolved gases which may be selectively removed from the hydrogel (e.g., salts). Removal of the temporary material (e.g., by salt leaching or gas foaming) yields an interconnected network of pores. Such interconnected pore networks have also been formed by critical point drying and by electrospinning polymers. These porous networks allow convective transport of oxygen and nutrients into the tissue and provide a wide surface area for them to diffuse into the cell-populated hydrogel. However, these fabrication strategies offer no control over the scaffold architecture and frequently make use of harsh cytotoxic conditions or reagents. Furthermore, the unstructured porous network would not be amenable to direct connection to host vasculature if implanted in an animal model.

Separately, needle-molding techniques have been introduced to produce straight channels in defined patterns within hydrogels. Polymer solutions are dispensed around an array of needles and then crosslinked to form a solid gel. The needles are pulled out after the gel solidifies to leave open channels. These needle-molded hydrogels have become useful tools for studying transport in vascular channels, but cannot fully recapitulate the complex, branched architecture of physiologic vasculature. Another approach to patterning vasculature, soft lithography, utilizes photolithographic techniques, which offer control of channel architecture at micron-scale resolution. However, the process involves expensive equipment and typically produces microfluidic vessels exclusively as linear x-, y-, or z-vectors that fail to mirror realistic vascular networks. Overall, neither soft lithography nor needle-molding can create complex, three-dimensional microfluidic networks which capture the architectural features of vasculature in vivo.

Additive manufacturing (AM, also known as three-dimensional printing or 3D printing) has been used to fabricate fluidic networks within biomaterials. To that end, sacrificial templating is one promising fabrication method. Using this technique, a defined pattern of fluidic channels may be fabricated within a bulk material by encasing a removable template within the bulk material. FIGS. 1A-1D are a stepwise series of schematics depicting sacrificial templating to form a simple vascular network. FIG. 1A shows a template 101 fabricated via an existing AM method. In FIG. 1B, template 101 is encased in a bulk material 103. After template 101 has been selectively removed from within bulk material 103, FIG. 1C depicts a simple vascular network 105 that reflects the architecture of template 101 defined by bulk material 103. After fabrication, arrows 107 in FIG. 1D indicate fluid flow through simple vascular network 105 within bulk material 103.

In a first method of forming the removeable template, water-soluble carbohydrate glass is first extruded into a self-supporting lattice and encapsulated in biomaterial hydrogels, as in Miller and Bellan. See J. S. Miller, et al. *Rapid Casting of Patterned Vascular Networks for Perfusable Engineered Three-Dimensional Tissues,* 11(9), Nat. Mater. 768-774 (2012) and L. M. Bellan, et al. *Fabrication of an Artificial 3-Dimensional Vascular Network Using Sacrificial Sugar Structures,* Soft Matter. 5(7), 1354. (2009). When the 3D-printed carbohydrate glass lattice was dissolved from within the bulk hydrogel, the geometry of the lattice was retained as open channels in the hydrogel matrix. While this method is able to create a variety of two-dimensional vessel networks, the resulting extruded sugar structures were brittle, and the method cannot be fully extended to create diverse three-dimensional architectures. Furthermore, the reproducibility of the final network geometry and the resolution of the printed filaments are both limited by the use of extrusion to form the carbohydrate glass network.

A second method of forming the removeable template utilizes a temporary fugitive ink that is extruded alongside one or more polymeric scaffold materials, for example in Bertassoni and Kolesky. See L. E. Bertassoni, et al. *Hydrogel Bioprinted Microchannel Networks for Vascularization of Tissue Engineering Constructs,* 14(13), Lab Chip, 2202-2211 (2014). D. B. Kolesky, 3*D Bioprinting of Vascularized, Heterogeneous Cell-Laden Tissue Constructs,* 26(19), Adv. Mater. 3124-3130 (2014). D. B. Kolesky, et al. *Three-Dimensional Bioprinting of Thick Vascularized Tissues,* Proc. Natl. Acad. Sci. U.S.A., 201521342 (2016). Subsequent removal of the fugitive ink creates a corresponding void space in the bulk material. As with carbohydrate glass printing, while it can create diverse 2D networks, it is not possible to print complex, arbitrary three-dimensional architectures using the fugitive ink extrusion technique.

BRIEF SUMMARY OF THE INVENTION

Some embodiments may be directed to a composition useful in forming a structure in the form of a substantially interconnected vascular network. In some embodiments, the composition may comprise a powder including a carbohydrate powder and an anti-caking agent, wherein the powder has a granular form, and has a specific energy of less than 6 millijoules per milliliter (mJ/mL).

In some embodiments, the carbohydrate powder may comprise at least one of dextran or isomalt.

In some embodiments, the anti-caking agent comprises at least one of cornstarch, silicon dioxide, or xanthan gum.

In some embodiments, the powder may be configured to be a free-flowing powder and the powder may have a maximum particle size of 250 micrometers (μm) or less.

Some embodiments may be directed to a three-dimensional structure comprising a powder system including a carbohydrate powder and an anti-caking agent.

In some embodiments, the three-dimensional structure may further comprise a surface coating comprising a hydrophobic polymer.

In some embodiments, the powder system may have been fused together into a solid, contiguous filament using a laser.

In some embodiments, the powder system may have been fused together into a solid, filament network using a laser.

In some embodiments, the structure may have undergone a surface smoothing using a smoothing solution.

In some embodiments, a smoothed structure may have been subsequently coated in a hydrophobic polymer.

Some embodiments may be directed to a structure comprising a substantially interconnected vascular network, comprising: a matrix material through which a structural material is disposed. In some embodiments, the structural material may be capable of dissolving or degrading in water. In some embodiments, the structural material may be formed from a powder that is fused into a solid when irradiated with an energy beam. In some embodiments, the powder system may have a granular form, and have a specific energy of less than 6 mJ/mL.

In some embodiments, the powder may have been fused together into a solid, contiguous filament using a laser.

In some embodiments, the powder may have been fused together into a solid, contiguous three-dimensional filament network using a laser.

In some embodiments, a surface of the structure may have smooth topography.

In some embodiments, the powder may further comprise an anti-caking agent.

In some embodiments, the structural material may comprise at least one carbohydrate.

In some embodiments, the structural material may comprise at least one of dextran or isomalt.

In some embodiments, the structural material may comprise at least one of photoresist, agarose, gelatin, carbohydrates, sucrose, glucose, fructose, lactose, isomalt, dextran, cellulose, methylcellulose, poly(lactic acid), or poly(ethylene glycol).

In some embodiments, the anti-caking agent may comprise one or more materials that improve at least one of flow, friction characteristics, or particle packing of the structural material.

In some embodiments, the anti-caking agent may comprise at least one of cornstarch, silicon dioxide, or xanthan gum.

In some embodiments, a particle size of the powder may be 250 μm diameter or less.

In some embodiments, a surface of the structure may have a hydrophobic coating.

In some embodiments, the hydrophobic coating may comprise at least one of polycaprolactone, poly(L-lactide), polylactic acid, poly(lactic co-glycolic acid), collagen, gelatin, zein, shellac, starch, wax, or petroleum jelly.

In some embodiments, the matrix material may comprise at least one of polyamide, poly(2-hydroxy ethyl methacrylate), poly(vinyl alcohol), polyacrylamide, poly(ethylene glycol), a polyurethane, collagen, agarose, albumin, alginate, chitosan, starch, hyaluronic acid, gelatin, fibrin, matrigel, glycerol, glycol, mannitol, inositol, xylitol, adonitol, glycine, arginine, biological polymeric molecules, or peptide amphiphiles, or monomers, dimers, or oligomers thereof.

In some embodiments, the powder may be configured to be a free-flowing powder.

Some embodiments may be directed to a method of forming a substantially interconnected vascular network. In some embodiments, the method may include: solidifying a powder by fusing with an energy beam to form a filament network; backfilling the void space of the filament network with a matrix material; and removing the filaments to form the substantially interconnected vascular network comprising fluidic channels. In some embodiments, the filament network may comprise a plurality of filaments and defines a void space, and the plurality of filaments may be capable of dissolving or degrading in water.

In some embodiments, the matrix material may be an aqueous solution comprising a biomaterial.

Some embodiments of the method may further comprise crosslinking the biomaterial to form a hydrogel in the void space.

In some embodiments, the powder may comprise a carbohydrate powder and an anti-caking agent. In some embodiments, the powder may have a granular form, and have a specific energy of less than 6 mJ/mL. In some embodiments, the energy beam may be a laser.

Some embodiments of the method may further comprise surface smoothing the plurality of filaments with a smoothing solution, wherein the surface smoothing otherwise does not alter an architecture of the filaments.

In some embodiments, the smoothing solution may comprise at least one of isomalt, dextran, sucrose, glucose, lactose, trehalose, maple syrup, or sugar cane syrup.

Some embodiments of the method may further comprise surface coating the plurality of filaments with a surface coating material, wherein the surface coating material does not backfill the void space and wherein the matrix material and the surface coating material may be different materials.

In some embodiments, the surface coating material may comprise at least one of polycaprolactone, poly(L-lactide), polylactic acid, poly(lactic co-glycolic acid), collagen, gelatin, zein, shellac, a starch, wax, or petroleum jelly.

In some embodiments, the filament network may be disposed in a three-dimensionally branched pattern.

In some embodiments, the filament network may be disposed in an interpenetrating geometry.

In some embodiments, the filaments may be configured in an unsupported geometry during fabrication.

In some embodiments, removing the filaments may be performed by dissolution or degradation.

In some embodiments, the aqueous solution may further comprise a suspension of living cells and wherein the step of removing the filaments does not damage the living cells.

In some embodiments, the matrix material may be a crosslinked biomaterial, and the biomaterial comprises at least one of polyamide, poly(2-hydroxy ethyl methacrylate), poly(vinyl alcohol), polyacrylamide, poly(ethylene glycol), a polyurethane, collagen, agarose, albumin, alginate, chitosan, starch, hyaluronic acid, gelatin, fibrin, matrigel, glycerol, glycol, mannitol, inositol, xylitol, adonitol, glycine, arginine, biological polymeric molecules, or peptide amphiphiles, or monomers, dimers, or oligomers thereof.

In some embodiments, the powder may be configured to be a free-flowing powder, and the powder may have a maximum particle size of 250 μm or less.

Other aspects and advantages of the invention will be apparent from the following description and the appended claims.

BRIEF DESCRIPTION OF THE DRAWINGS

FIGS. 1A-1D are schematics of a method of the prior art.
FIGS. 12A-12F are photographs of interconnected vascular networks, according one or more embodiments.
FIGS. 13A-13E depict an interconnected vascular network, according one or more embodiments.
FIGS. 14A-14E depict an interconnected vascular network, according one or more embodiments.
FIGS. 15A-15F depict an interconnected vascular network, according one or more embodiments.
FIGS. 16A-16F depict an interconnected vascular network, according one or more embodiments.
FIGS. 21A-21G depict an interconnected vascular network, according to one or more embodiments.

Throughout the figures, similar numbers are typically used for similar components.

DETAILED DESCRIPTION OF THE INVENTION

Figure 2B:
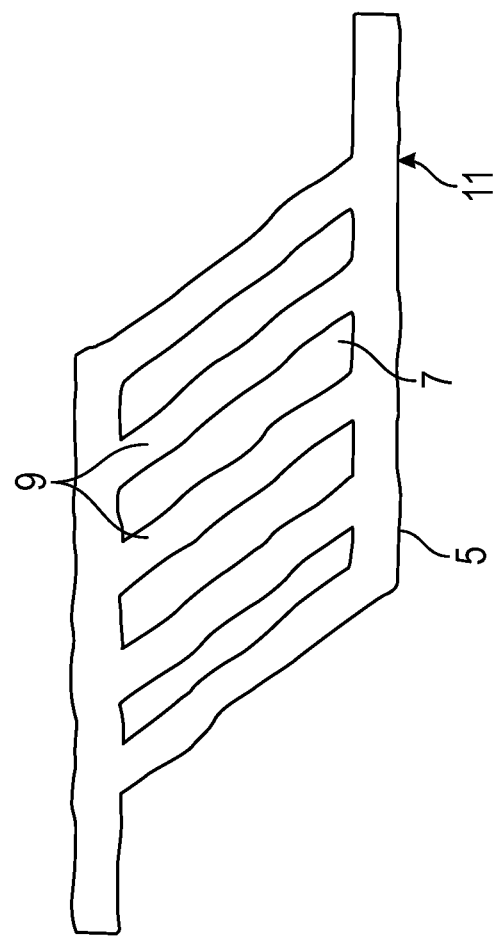
FIGS. 2A-2F are schematics of the method, according to some embodiments.

A key limitation of the existing AM methods is the inability to construct complex networks in all three dimensions within a range of materials. Liquid-phase materials deposited via extrusion, such as those employed in the above AM methods, are subject to deformation or collapse under their own weight. Furthermore, the viscosity of the liquids makes precisely dispensing small volumes quite challenging (as may be required to form omnidirectional structures in a layer-by-layer fashion). These intrinsic rheological limitations prohibit extrusion-based AM techniques, such as those described above, from forming architectures which include unsupported overhangs, underhangs, and/or arbitrary three-dimensional branching, all of which are hallmarks of the mammalian vasculature. Moreover, the 90-degree channel junctions, formed as a result of extruded rectilinear networks, have markedly different fluid dynamics than the structures found in nature. The altered fluid dynamics of networks formed using existing AM techniques have undesirable implications for hemodynamics, shear stresses experienced by endothelial cells, and the overall fluidic resistance of the network.

In contrast, the sugar alcohol isomalt was discovered to be compatible with selective laser sintering (SLS) and undergoes a stable melting transition to form contiguously fused solid filaments. Accordingly, embodiments described herein may be directed toward compositions of matter and methodologies that may be employed to generate patterned SLS, including a workflow for fully automated fabrication of three-dimensional structures from various carbohydrate powders.

Further, SLS of carbohydrates as described herein is a novel approach to additive manufacturing of this class of materials. The method disclosed in embodiments herein offers significant improvement over previous methods of fabricating carbohydrate structures, such as improved resolution, structural complexity, reproducibility, and throughput.

To that end, some embodiments may be directed to SLS patterned structures in the form of a solid, contiguous filament or a solid, contiguous three-dimensional structure, such as a three-dimensional dendritic carbohydrate lattice or solid, contiguous filament networks. In some embodiments, the patterned structures may be used to template a matrix material. In some embodiments, the patterned structures may be used to cast vascularized engineered tissues (e.g., the structures may be described as matrices with embedded perfusable vascular networks). Furthermore, some embodiments of this disclosure may be directed toward a composition of matter and a method for fabricating engineered vascular networks unconstrained by the limitations of existing extrusion printing techniques such as those described above. Embodiments of the composition of matter may be compatible with SLS and undergo a stable melting transition to form contiguously fused solid filaments. Further, embodiments described herein may include a workflow for fully automated fabrication of three-dimensional structures from various carbohydrate powders. Finally, one or more embodiments are directed toward a method called Mutual Tree Attraction for computationally generating a dendritic substantially interconnected vascular network.

Broadly, FIGS. 2A-2F briefly depict steps for forming a substantially interconnected vascular network that may be used in embodiments of the method. As in FIGS. 2A-2F, embodiments of the method may include the steps of: solidifying powder granules by sintering or melting with an energy beam to form a three-dimensional structure to be used as a template; surface smoothing the template with a smoothing solution; surface coating the template with a surface coating material; backfilling a void space of the template with a matrix material; crosslinking the matrix material; and removing the template to form the patterned structure having channels shaped like the template. This method has been termed Selectively Laser Sintered-Carbohydrate Sacrificial Templating (SLS-CaST). Furthermore, each of the steps briefly depicted in FIGS. 2A-2F will also be discussed in greater detail below.

Figure 2A:
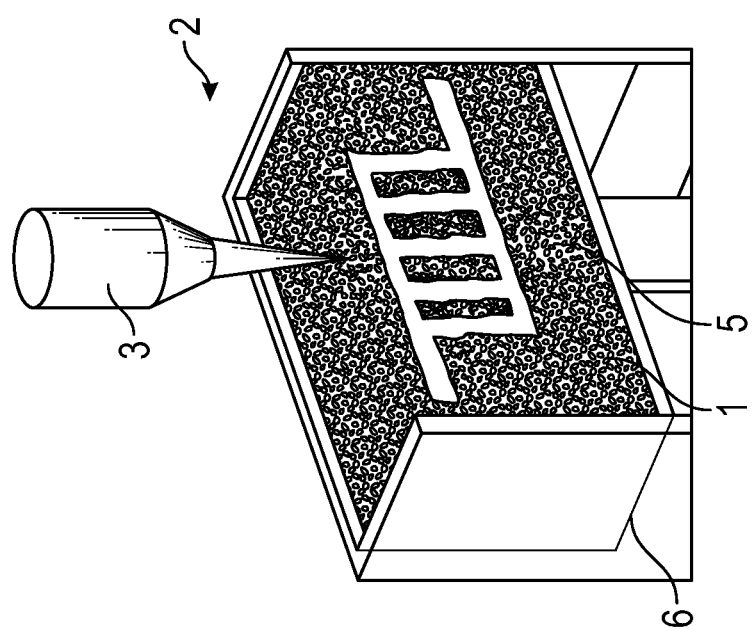

In some embodiments, SLS may be used to form a three-dimensional structure by tracing a 2D pattern with an energy beam focused onto a layer of the powder. Embodiments of the powder may include one or more carbohydrate powder(s)) and may fuse together to form a structural material. FIG. 2A depicts granules of a powder 1 being fused together using an SLS system 2 via sintering or melting with a laser 3 to form a filament network 5. The shape drawn by laser 3 may be controlled by the movement of stage 6, movement of laser 3, or both.

In some embodiments, a three-dimensional structure formed of a structural material via SLS may be used as a template. Initially after formation, the surface of the three-dimensional structure may be rough. FIG. 2B depicts filament network 5 after removal from the 3D printing system. Void space 7 can be seen surrounding filament network 5, including between filaments 9. Thus, filament network 5 defines void space 7. A surface 11 of filament network 5 is rough.

Figure 2D:
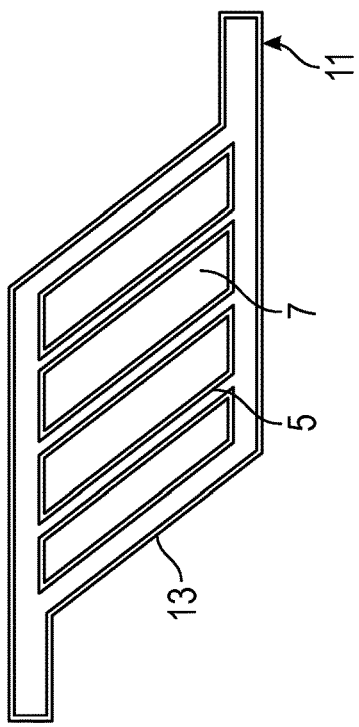
Figure 2F:
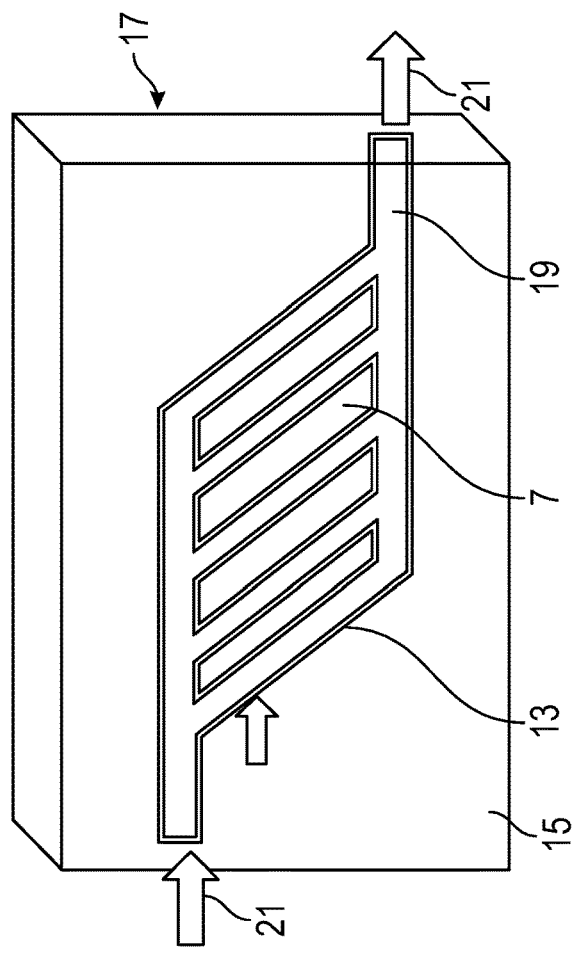
Figure 2C:
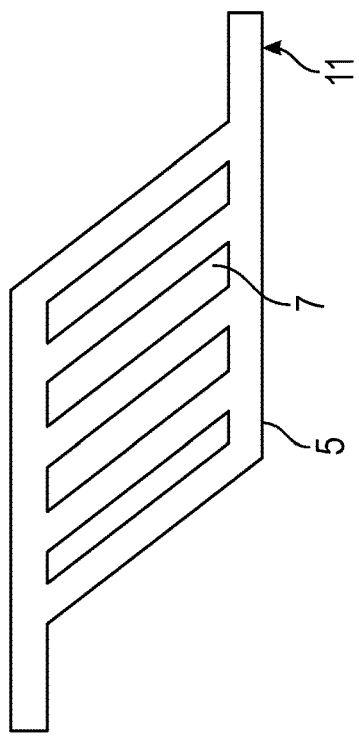

In some embodiments, the surface of the filament network may be smoothed with a smoothing solution. FIG. 2C depicts filament network 5 after undergoing surface smoothing to decrease the roughness of surface 11. Surface smoothing caused filament network 5 to become a smoothed structure.

In some embodiments, the surface of the filament network may be surface coated with a surface coating material. FIG. 2D depicts filament network 5 after a surface coating material has formed a coating 13 on surface 9 of filament network 5. However, coating 13 does not backfill void space 7.

Figure 2E:
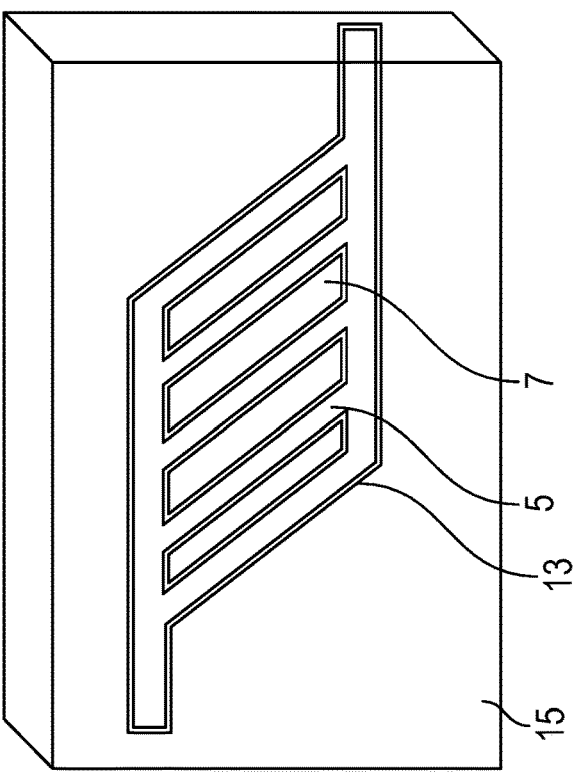

In some embodiments, the void space surrounding the filament network is backfilled with a matrix material. FIG. 2E depicts a matrix material 15 surrounding filament network 5 and backfilling void space 7. After introduction around the filament network, some embodiments of the matrix material may require crosslinking or other polymer processing to solidify within the void spaces.

In some embodiments, the filament network may be removed to form the substantially interconnected vascular network. The form of the final vascular network may include fluidic channels through the matrix material that reflect the geometry of the filament network. FIG. 2F depicts a substantially interconnected vascular network 17 that includes fluidic channels 19 defined by coating 13 and matrix material 15. Arrows 21 indicate one potential fluid flow direction through vascular network 17.

A Powder, Per One or More Embodiments

Embodiments of the powder may include one or more carbohydrate powders.

Embodiments of the powder may further include pigment(s), anti-caking agent(s), or both. Some embodiments of the powder may have the ability to flow, as may be quantified using the specific energy. Embodiments of the powder may be in granular form having a large number of powder granules having particular geometric characteristics (e.g., average diameter). Each of these factors of the powder are detailed below.

Embodiments of the powder may include one carbohydrate powder or a mixture of two or more carbohydrate powders. The carbohydrate powders may include or consist of, for example: photoresist, agarose, gelatin, carbohydrates, sucrose, glucose, fructose, lactose, isomalt, dextran, cellulose, methylcellulose, poly(lactic acid), and/or poly(ethylene glycol).

As discussed above, prior work used sugars formed via melt extrusion for sacrificial templating; however, the results were brittle and the final three-dimensional shapes were limited. In contrast, isomalt (a sugar alcohol frequently used as an artificial sugar substitute) and dextran were found to be compatible with SLS and to undergo a stable melting transition to form contiguously fused solid filaments. Thus, isomalt and dextran may be used to form three-dimensional structures, including complex three-dimensional structures such as vascular architectures. Thus, in some embodiments, the powder may include one or both of isomalt and dextran powders.

In some embodiments, the powder may have the ability to flow for dispensing during SLS. Specific energy is one measure of powder flowability. To that end, some embodiments of this disclosure utilize a powder, with or without an anti-caking agent, having a specific energy of less than 6 millijoules per milliliter (mJ/mL) (e.g., less than 5 mJ/mL or less than 4 mJ/mL). Put another way, some embodiments of this disclosure utilize a powder, with or without an anti-caking agent, having a specific energy of between 6 mJ/mL and 0.1 mJ/mL (e.g., between 5 mJ/mL and 0.1 mJ/mL, between 4 mJ/mL and 0.1 mJ/mL, or between 2 mJ/mL and 0.1 mJ/mL).

The addition of an anti-caking agent may effectively augment powder flow while preserving sintering quality. To that end, in some embodiments, one or more anti-caking agents may improve the characteristics of a powder compared with a similar powder lacking an anti-caking agent, for example, flow, flowability, friction characteristics, and/or particle packing of the structural material.

Thus, according to some embodiments, the powder for SLS may be a mixture of one or more carbohydrate powder(s) and one or more anti-caking agent(s). In some embodiments, the anti-caking agent may include, but is not limited to, one or more of: cornstarch, silicon dioxide, or xanthan gum or a mixture of two or more anti-caking agents.

Figure 3:
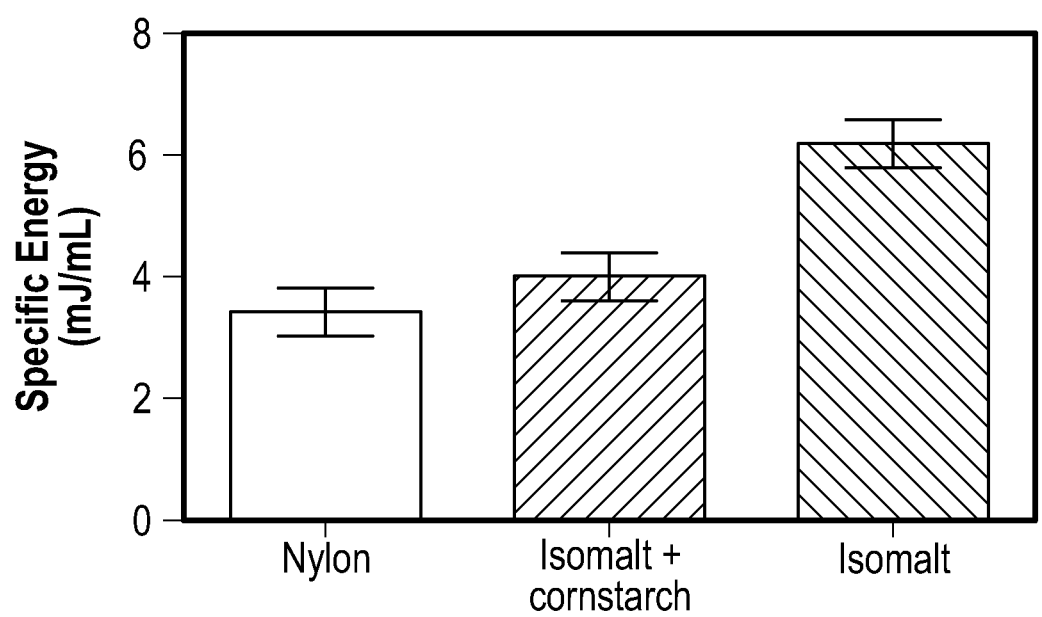
FIG. 3 is a graph of the specific energy of the powder, according to embodiments of the disclosure.

Nylon is a standard material for SLS because it has favorable powder rheology properties; however, nylon may be undesirable for a particular application, for example because it is insufficiently biocompatible, not readily dissolvable, or another reason. Accordingly, FIG. 3 compares the specific energy of nylon with that of isomalt and of a mixture comprising 30 mass percent (wt %) cornstarch in isomalt (referred to hereinafter as "isomalt+cornstarch"), according to one or more embodiments of the disclosure. As shown, isomalt powder granules have a higher specific energy and thus are much more cohesive than standard SLS materials such as nylon, which may manifest as poor powder distribution or uneven layers. FIG. 3 also shows that the isomalt+cornstarch mixture has comparable flowability to nylon. Thus, isomalt+cornstarch is able to free-flow like nylon. The data for isomalt and isomalt+cornstarch have a probability value (p-value) of $p<0.05$ for a t-test with the sample size (n), n=3.

Figure 4B:
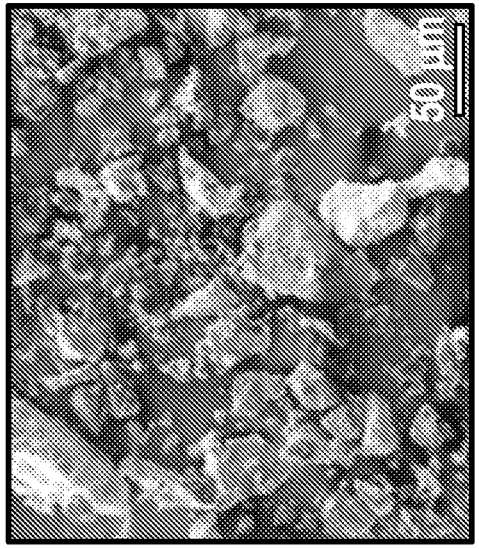
FIGS. 4A-4C are scanning electron micrographs of the powder, according to embodiments of the disclosure.
Figure 4C:
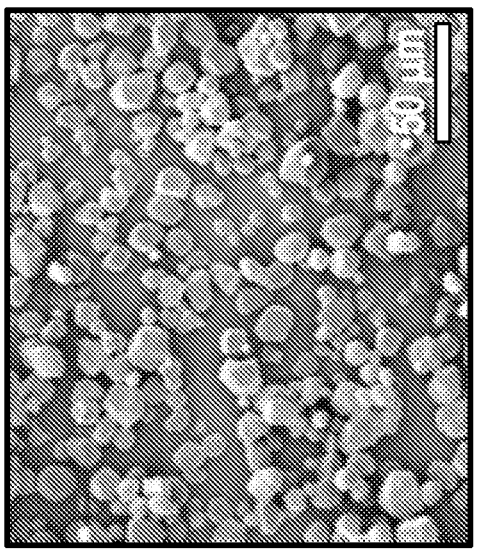
Figure 4A:
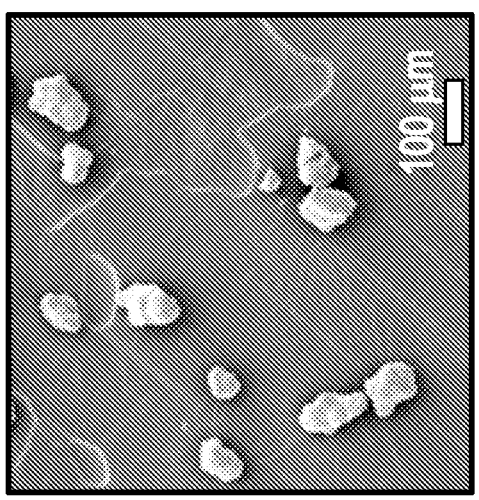

FIGS. 4A-4C are scanning electron micrographs of nylon (FIG. 4A), isomalt (FIG. 4B), and cornstarch (FIG. 4C) that illustrate the varying powder morphology and help to explain differences in powder flowability. Nylon is an extremely free-flowing powder used in conventional polymer SLS processes. As shown in FIG. 4A, nylon has a relatively small, smooth, and regular morphology. In contrast, isomalt powder is irregular, polydisperse, and jagged as shown in FIG. 4B. Consequently, isomalt powder has higher powder cohesion and relatively poor flowability compared with nylon. As discussed above, the addition of cornstarch significantly improves the flowability of powdered isomalt. FIG. 4C shows powdered cornstarch. The small, smooth cornstarch particles are hypothesized to intercalate between the large, jagged isomalt grains to reduce friction and resistance to flow.

The inclusion of a pigment may allow the powder to more efficiently absorb the radiation from the energy beam (e.g., laser) during SLS. Additionally, inclusion of a pigment may also enable successful fabrication using a visible spectrum energy beam. Thus, some embodiments of the powder may include one or more pigment. In some embodiments, the pigment may be a biocompatible pigment. In some embodiments, the biocompatible pigment may include one or more of: tartrazine, anthocyanin, and Allura Red AC (Red 40). As with the anti-caking agent discussed above, the pigment may be incorporated into the final three-dimensional structure upon SLS.

According to some embodiments, a particle size described herein may be defined as an average particle diameter, a mean particle diameter, a median particle diameter, a mode of the particle diameter, a weighted mean of the particle diameter, a mean Feret diameter, a Sauter mean diameter, a maximum of a probability density function of the particle diameter (using any applicable mathematic model, such as a log-normal distribution, a Weibull distribution, a Rosin-Rammler distribution, a log-hyperbolic distribution, a skew log-Laplace model distribution, and additional models derived therein), or some other statistical metric that may be used to determine and/or define the diameter of the particles.

In one or more embodiments, a particle size of the powder (for example, measured as the mean Feret diameter or another way as discussed above) may be less than 250 micrometers ($\mu m$) diameter (e.g., less than 200 $\mu m$, less than 100 $\mu m$, less than 50 $\mu m$, less than 10 $\mu m$, etc.). Put another way, some embodiments of this disclosure utilize a powder with a particle size of between 250 $\mu m$ and 0.01 $\mu m$ (e.g., between 200 $\mu m$ and 0.01 $\mu m$, between 100 $\mu m$ and 0.01 $\mu m$, between 50 $\mu m$ and 0.01 $\mu m$, or between 10 $\mu m$ and 0.01 $\mu m$).

In some embodiments, milling, grinding, mechanically separating, and/or sieving, may be performed to ensure the powder has an intended particle size and/or particle size distribution. Such particle size operations may be performed on one or more components of the powder separately (i.e., before mixing), after combining two or more components of the powder, or both. Furthermore, in some embodiments, a powder may be a mixture of powder grains of carbohydrate(s) with or without anti-caking agent(s) that have been milled and/or ground to reduce their grain size and/or particle side prior to sintering.

In some embodiments, the powder may also be separated, by mechanical or other means, to select powder grains below a threshold size. One such method for separating powders by size may be sieving, but alternative methods may also be employed. When the powder includes two or more component powders (i.e., carbohydrate powder(s) and/or anti-caking agent(s)), these particle processing methods may be performed before and/or after mixing the component powders.

In some embodiments, the particle size in the powder may impact a powder layer height of a single layer, and the powder layer height may impact the final resolution of the three-dimensional structure. If the powder layer height of each additional layer of un-sintered powder is too thick (i.e., contains too much powder), the powder may fail to fully fuse together. Powder that is not fully fused may not be properly added to the three-dimension structure as it grows, thus the process may fail to form a contiguous three-dimensional structure. In contrast, if each newly-added layer is too thin (i.e., does not contain enough powder), the laser may over-sinter the previous layer, which may undesirably alter the final geometry.

The powder may be able to free-flow to form layers with a powder layer height (when in a granular form) that may be successfully formed into a structural material via sintering, according to one or more embodiments. In some embodiments, the powder layer height may be less than 250 $\mu m$ (e.g., less than 225 $\mu m$, less than 210 $\mu m$, less than 200 $\mu m$, less than 175 $\mu m$, less than 150 $\mu m$, etc.). In some embodiments, the powder layer height may also be greater than 100 $\mu m$ (e.g., greater than 110 $\mu m$, greater than 120 $\mu m$, greater than 125 $\mu m$, greater than 150 $\mu m$). In some embodiments, the powder layer height may be in the range from 100 $\mu m$ to 250 $\mu m$ (e.g., in the range from 100 $\mu m$ to 225 $\mu m$; in the range from 125 $\mu m$ to 225 $\mu m$; in the range from 125 $\mu m$ to 200 $\mu m$; in the range from 100 $\mu m$ to 200 $\mu m$; in the range from 100 $\mu m$ to 175 $\mu m$, etc.).

Solidifying a Powder by Sintering or Melting, Per One or More Embodiments

SLS is a versatile form of 3D printing that may be used to form a structural material by tracing a two-dimensional pattern with an energy beam focused onto a layer of a powder that may be employed in some embodiments. Some embodiments of the method may use SLS to solidify a powder, for example a powder discussed above. In some embodiments, the powder may be sintered or melted with to form a solid of a structural material, which may be in the shape of a three-dimensional structure. In some embodiments, this three-dimensional structure may be used as a template. In some embodiments, the energy beam used for SLS may be a laser beam. The SLS process and characteristics of the resulting structural material are detailed below.

In some embodiments, the powder may become fused during SLS (for example, melted or sintered due to heat) to form the structural material as it absorbs the electromagnetic radiation transmitted via the energy beam. To that end, in some embodiments, the structural material is formed when the powder is irradiated with an energy beam. Thus, a path of the energy beam in two dimensions may cause a region of the powder to fuse, forming the structural material. Patterning sequential layers in a third dimension may fuse the structural material together in all three dimensions to form a three-dimensional structure. Thus, the three-dimensional structure may be fabricated by repeating this process in a layer-by-layer fashion, whereby an un-sintered layer of the power system may be spread over a previously-fused layer(s) and may be patterned by being exposed to the energy beam so as to add to the three-dimensional structure.

FIGS. 5A-5D illustrates a schematic of a three-dimensional printing process via SLS, according to one or more embodiments. Each of these steps are briefly discussed below and detailed further.

Figure 5B:
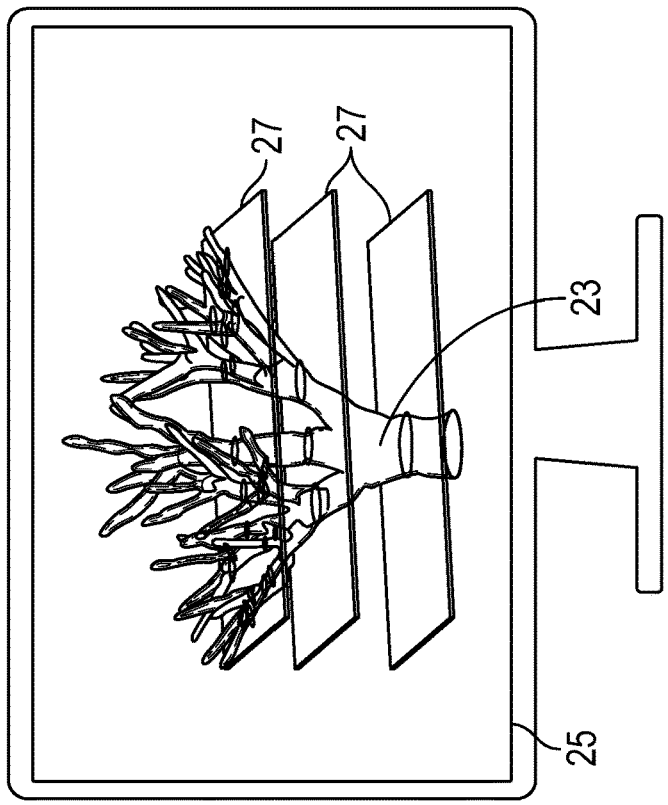
FIGS. 5A-5D are schematics of selective laser sintering, according to embodiments of the disclosure.
Figure 5A:
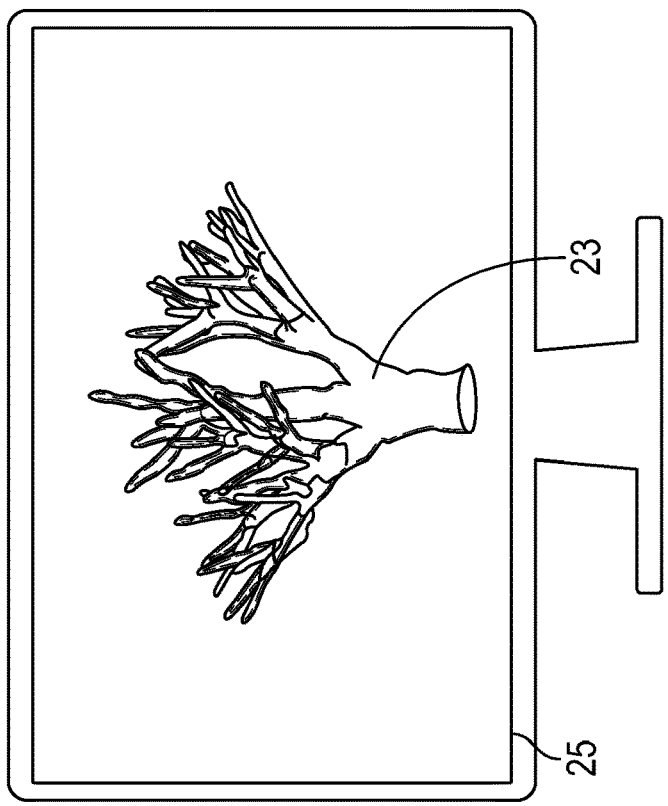

FIG. 5A depicts a digital rendering 23 performed by a computer 25 of a three-dimensional structure to be printed.

FIG. 5B depicts digital rendering 23 in computer 25 being converted into three two-dimensional digital slices 27. These digital slices 27 correspond to where the laser may solidify the powder into the three-dimensional structure during SLS.

Figure 5D:
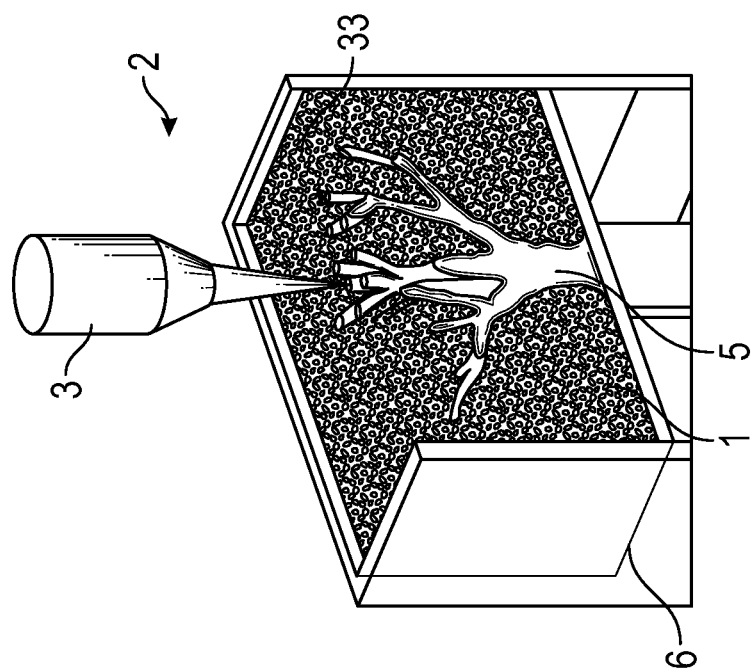
Figure 5C:
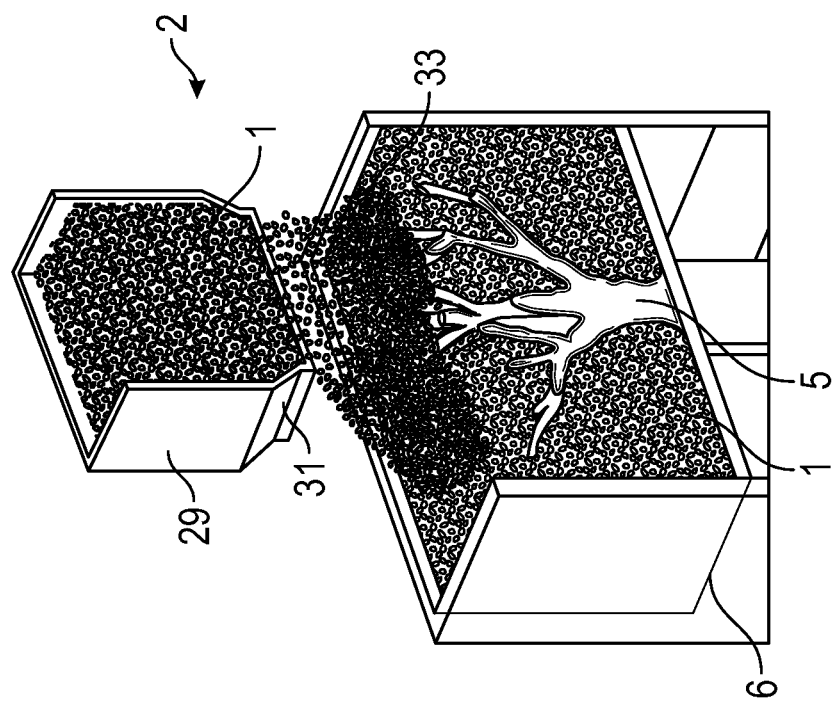

FIG. 5C depicts powder dispensing as part of layer-by-layer fabrication of a filament network via SLS.

Here, an SLS system 2 has a stage 6, powder reservoir 29, and a sieve 31. SLS system 2 has partially formed a filament network 5. Powder reservoir 29 stores powder 1. Sieve 31 dispenses a powder layer 33 of powder 1 onto stage 6 in preparation for fusion/melting with an energy beam. Stage 6 may be a z-stage, an x-y stage, or an x-y-z stage (where the z-direction is defined as the direction of flow of powder reservoir 29 from sieve 31).

Although not depicted here, sieve 31, stage 6, or both may be controlled by a microelectronic controller. A microelectronic controller may control one or more aspects of SLS 2, for example a flow rate of powder 1 onto stage 6 or the location powder 1 is dispensed onto stage 6. Such a microelectronic controller may control one or more aspects of powder layer 33, for example, powder layer 33 thickness. Additional details of microcontroller(s) within SLS system 2 are discussed further.

FIG. 5D depicts laser patterning as part of layer-by-layer fabrication of a filament network via SLS.

Here, SLS system 2 also includes a laser 3. Laser 3 sinters/fuses powder layer 33 to add to filament network 5.

Although not depicted here, laser 3, stage 6, or both may be controlled by a microelectronic controller. A microelectronic controller may control one or more aspects of SLS 2, for example the various characteristics of laser 3 or the location laser 3 is sintering powder layer 33. Such a microelectronic controller may control one or more aspects of powder layer 33, for example, powder layer 33 thickness. Additional details of microcontroller(s) within SLS system 2 are discussed further.

Prior to beginning the SLS fabrication, a 3D model may be digitally rendered using, in some embodiments, a computer-aided design (CAD) software. Such a rendering may then be exported into a file, such as a ".STL" file, for example, compatible with a computer-aided 3D printing platform, termed an SLS system. This SLS file may assist in translating the 3D model from CAD into precise instructions required for the SLS system's various tasks outlined above. One such format, according to some embodiments, may be a stereolithography (.stl) format.

The SLS file may also be processed by additional software which may transform the 3D model by slicing it into a series of 2D cross-sectional slices, each of which may be used to pattern, for example, one layer of the powder. In some embodiments, parameters may be specified during this slicing process that govern the behavior of the SLS system during sintering. In some embodiments, a speed and/or a power of the energy beam and/or a height of each of the layers may be set and/or customized by one or more software programs. The series of 2D slices may be represented as a series of instructions for the SLS system, expressed in a final format that may be, in some embodiments, the G-code language. The series of instructions may, in some embodiments, move the energy beam to a specific point or along a specific path, lower the print platform, and/or move the powder distributor, along with any other instructions. In some embodiments, the series of instructions for the SLS system may be further modified by a custom-developed program that may optimize the instructions specifically for SLS of carbohydrate powder(s) to ensure proper interpretation by the SLS system and/or may allow energy beam power density/energy beam scan speed settings to be specified.

Production of a three-dimensional structure made of a structural material from a powder that includes carbohydrate powder(s), according to embodiments this disclosure, may be performed with an SLS system. This SLS system may be an automated, computer-aided 3D printing platform which uses additive manufacturing to create the three-dimensional structures from the powder in the layer-by-layer fashion according to the series of instructions. To precisely control the spatial positioning of the energy beam, the energy beam of the SLS system may be mounted to a gantry or other such mechanism. According to some embodiments, the SLS system may also include a print platform that moves freely in a z-direction so it may, for instance, advance downwards after a layer of the powder has been sintered. In some embodiments, a next layer of the powder may be formed atop the print platform by depositing a metered amount of the un-sintered powder from a powder hopper and then smoothing said metered amount of the un-sintered powder using a distributor.

The SLS process may be coordinated by a microelectronic controller in the SLS system, which controls the motors, valves, mechanisms, etc. responsible for various tasks. In some embodiments, those tasks may include, for example, any of: positioning, aiming, and controlling the output of the energy beam; positioning and moving the print platform; positioning and controlling the mechanism of the powder hopper, positioning and engaging the distributor; and other tasks for fusing the powder into a solid.

Solidification using an SLS set may begin with a first layer of the powder that is manually deposited on the print platform and leveled by the user, in some embodiments. Once the first layer of powder is on the print platform, the series of instructions may be executed in succession such that the first layer of the powder may be patterned by the energy beam (e.g., the laser), followed by a second layer of powder that may be deposited from the hopper, and so forth. Alternatively, in some embodiments, the first layer may be mechanically metered and distributed by the SLS system such that distributing the first layer is a first instruction of the series of instructions.

In some embodiments, the powder may be added for the subsequent layer by shaking a sieve connected to a powder reservoir suspended above the stage. Some embodiments may employ a shaking motion (for example, of the sieve) to dispense the powder. Such a shaking motion may aerate the powder and/or reduce compaction of the powder. After dispensing the powder from the suspended reservoir, in some embodiments, a dispensed quantity of the powder may be spread into a powder layer having an approximately equal layer thickness. Distribution of the dispensed quantity of the powder may be performed by a counter-rotating roller, for example. Finally, in some embodiments, excess powder (meaning, more than is required to form the powder layer) may be removed (for example, by a plow mechanism) and collected for redistribution. Excess powder may be redistributed many times (for example, tens to hundreds of times) without a noticeable decrease in print quality.

The SLS system may alternate between patterning a last layer of the powder and depositing a next layer of the powder until a final geometry has been sintered.

The appearance and quality of a three-dimensional structure formed via SLS may be influenced by various factors, including: laser power density, laser scanning speed, and/or powder layer height. Proper control of these settings, according to one or more embodiments, may allow for consistent sintering of powders to create the three-dimensional structure. Improper values (or combinations of values) of factors such as these may result in the final geometry differing from an intended three-dimensional structure by lowering the resolution of features, adding unintended features, subtracting intended features, failing to fully fuse powder, creating balling defects, distorting the final three-dimensional structure, adding cavities, and/or other undesired alterations to the intended final geometry.

One having skill in the art will realize laser power density and laser scanning speed may be interrelated. For instance, a low-powered laser moving with a slow scanning speed may still impart excessive power to a region. Excessive power may cause over-sintering, distortions, cavities, and/or other undesired alterations to the intended final geometry.

Over-sintering is when particles lying outside of the intended pattern are fused along with particles within the intended pattern being fused to form the intended final geometry. Over-sintering may occur in the z-axis (i.e., the build axis) and/or the x-axis/y-axis (i.e., the planar axes). In some embodiments, over-sintering may cause excessive fusion between successive powder layers, which may lower the resolution of the final geometry along the build axis and/or may add unintentional features in the build and/or planar axes.

When the laser power density is too high and/or the laser scanning speed is too low, undesired alterations to the final geometry like over-sintering may occur. Additionally, low laser scanning speed may cause an irregular melt pool while the powder is sintered. The irregular melt pool may lead to additional undesired alterations to the intended final geometry, such as distortions and/or cavities.

Alternatively, when the laser power density is too low and/or the laser scan speed is too fast, the powder may fail to form a continuously fused final three-dimensional structure. These circumstances may, in some embodiments, cause the balling defect that may sometimes be seen in SLS: when insufficiently melted, some powder may ball up into disconnected spheres instead of forming the final three-dimensional structure.

In some embodiments, for a given powder, the width of a filament may be a function of laser power, translation speed, or both. Thus, some embodiments may control the laser power, translation speed, or both to control filament dimensions.

Figure 6:
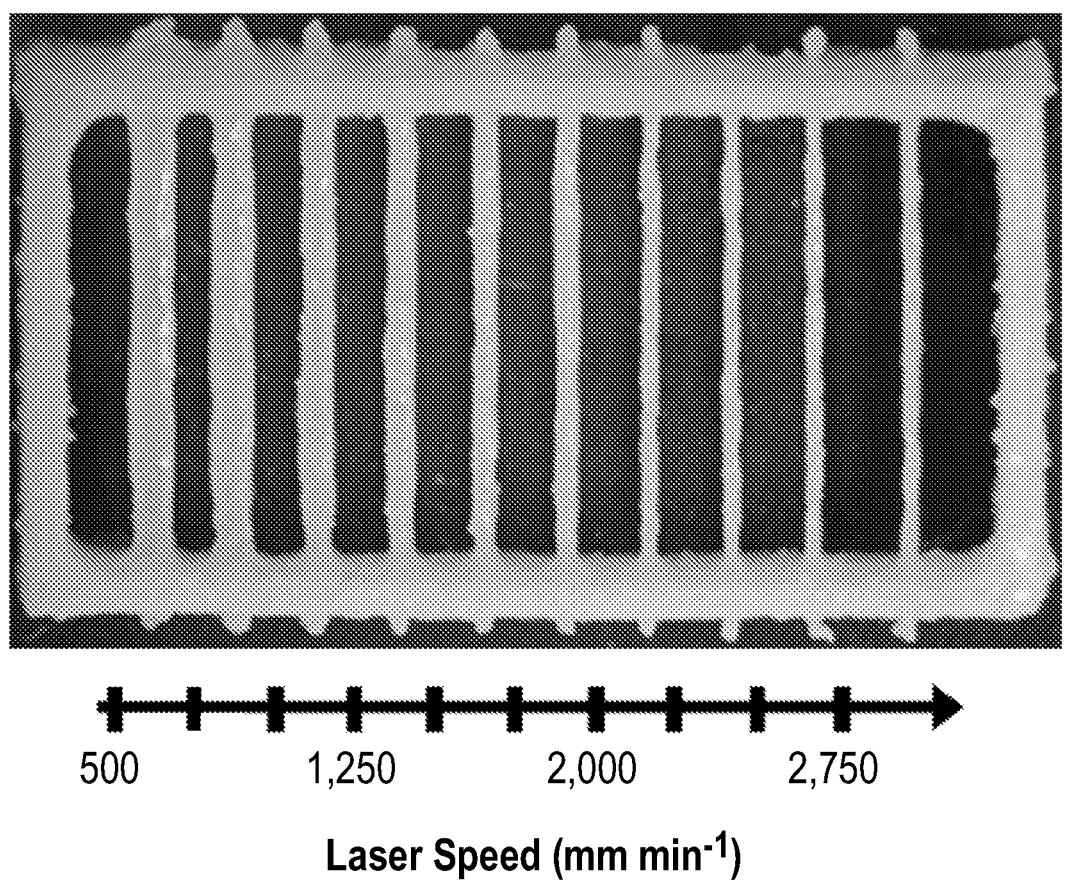
FIG. 6 is a photograph of a filament network, according to one or more embodiments.
Figure 7:
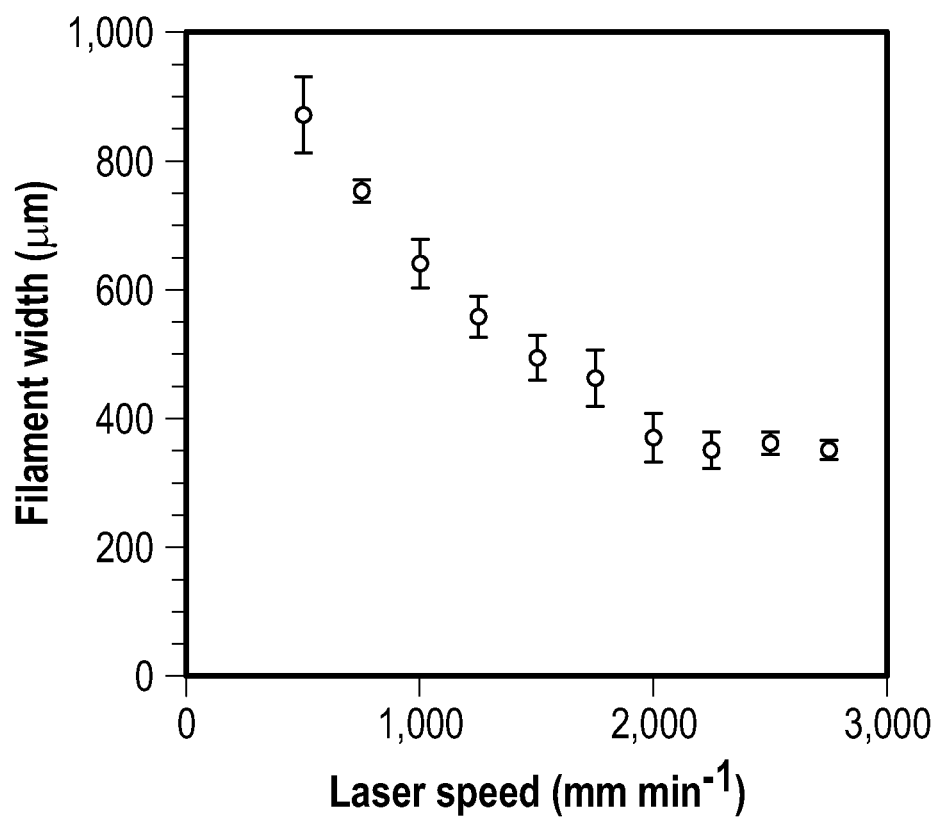
FIG. 7 is a graph showing filament width vs. laser power, according to one or more embodiments.

In some embodiments, there may be an approximately linear relationship with a negative correlation between translation speed and filament diameter. FIGS. 6 and 7 evidence an embodiment where the relationship between translation speed and filament diameter is approximately linear with a negative correlation. The negative correlation is apparent in FIGS. 6 and 7 in that the filament width decreases as the laser speed increases. FIG. 6 is a photograph of a three-dimensional structure comprising multiple filaments fabricated at a fixed power density of 45 watts per square millimeter (W mm$^{-2}$). Upon increasing the translation speed of each successive filament from 500 to 2,750 millimeters per minute (mm min$^{-1}$), the diameter of the filaments decreased from 800 to 400 μm (scale bar=1 mm). FIG. 6 is a representative image of five images captured following the fabrication of each three-dimensional structure. FIG. 7 numerically graphs the filament width versus the laser speed for those five three-dimensional structures (including FIG. 6). This graph shows an approximately linear relationship with a negative correlation between translation speed and filament diameter in a regime spanning 400-800 μm at a fixed power density of 45 W mm$^{-2}$. The graph shows the average filament width and the standard deviation for n=5 print runs.

In some embodiments, the laser power density may be between in the range from 20 to 100 W/mm, such as from 40 to 60 W/mm$^2$ (e.g., in the range from 45 W/mm$^2$ to 60 W/mm$^2$, in the range from 40 W/mm$^2$ to 55 W/mm$^2$, in the range from 45 W/mm$^2$ to 55 W/mm$^2$, in the range from 40 W/mm$^2$ to 50 W/mm$^2$, or in the range from 50 W/mm$^2$ to 60 W/mm$^2$).

In some embodiments, the laser scanning speed may be in the range from 200 to 4000 mm/min, such as from 1000 mm/min to 2000 mm/min (e.g., in the range from 1250 mm/min to 2000 mm/min, in the range from 1250 mm/min to 1750 mm/min, in the range from 1000 mm/min to 1750 mm/min, in the range from 1250 mm/min to 2000 mm/min, in the range from 1500 mm/min to 2000 mm/min, or in the range from 1000 mm/min to 1500 mm/min).

Using the SLS system, according to one or more embodiments, three-dimensional structures exhibiting heterogeneous three-dimensional branching, smooth curvature, and unsupported geometry may be fabricated. For example, FIGS. 8A and 8B (scale bars=10 mm) are photographs of three-dimensional structures formed of the structural material that were fabricated using SLS of a powder comprising a mixture of isomalt and 30 mass percent (w %) cornstarch material, according to one or more embodiments. The structures of FIGS. 8A and 8B exhibit smooth curvature, hierarchical branching, and unsupported overhangs, all of which are architectural motifs of the mammalian vasculature.

A resolution of a final geometry of a three-dimensional structure, such as an interconnected vascular network produced via one or more embodiments described herein, may be limited by a resolution of an SLS system. The resolution of the SLS system may be limited by factors such as optics of an energy beam (e.g., a laser spot size), which may define an approximate minimum diameter of a sintered filament formed according to one or more embodiments. Alternative optics may be utilized to reduce the laser spot size, which may produce the final geometry that includes smaller filaments, according to some embodiments. Additionally, resolution of the SLS system may be limited by the thickness of the powder layers, which may be limited by the diameter of the powder. Thus, thinner powder layers, and accordingly more finely ground powder, may produce the final geometry that includes smaller filaments, according to some embodiments.

In some embodiments, a filament may have a minimum diameter of 300 μm (for example, 200 μm, 100 μm, 50 μm, 10 μm, or 1 μm). In some embodiments, a filament (formed by a single pass of the energy beam) may have a maximum diameter of 1 mm (for example, 5 mm, 10 mm, 50 mm, 100 mm, or 500 mm).

Figure 8A:
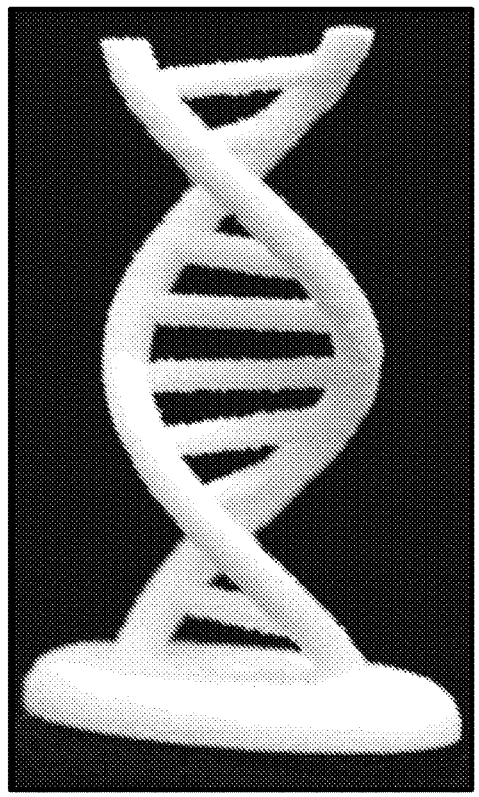
FIGS. 8A and 8B are photographs of a filament network, according to one or more embodiments.
Figure 8B:
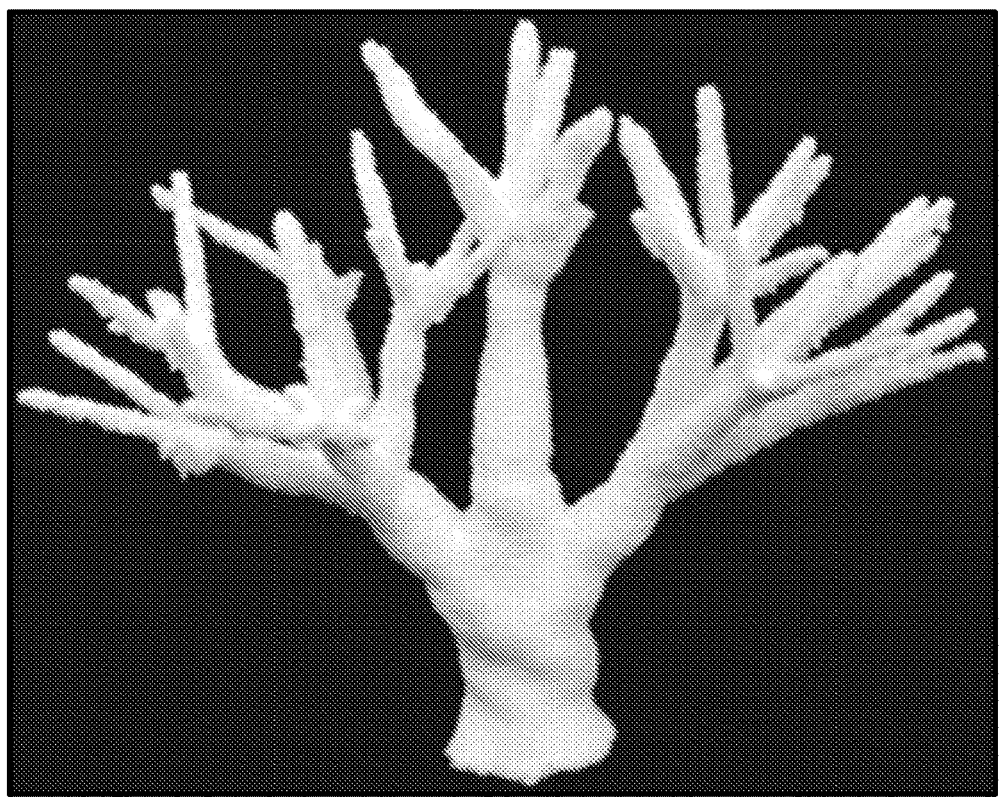

As in the embodiments depicted in FIGS. 8A and 8B, three-dimensional structures formed from a powder containing an anti-caking agent may include both the anti-caking agent and the carbohydrate powders in the final structure. Put another way, in some embodiments, energy beam irradiation as occurs during SLS of a powder including carbohydrate powder(s) and anti-caking agent(s) may sinter and/or melt both the carbohydrate powder(s) and the anti-caking agent(s) during solidification into the final three-dimensional structure.

Sintered structural materials fabricated of isomalt or isomalt+cornstarch as depicted here, according to one or more embodiments, are stiff and brittle, with Young's modulus on the same order of magnitude as extruded carbohydrate glass. Such structural materials may be robust enough to support their own weight, endure multiple post-processing steps, and/or be shipped between labs.

Figure 9:
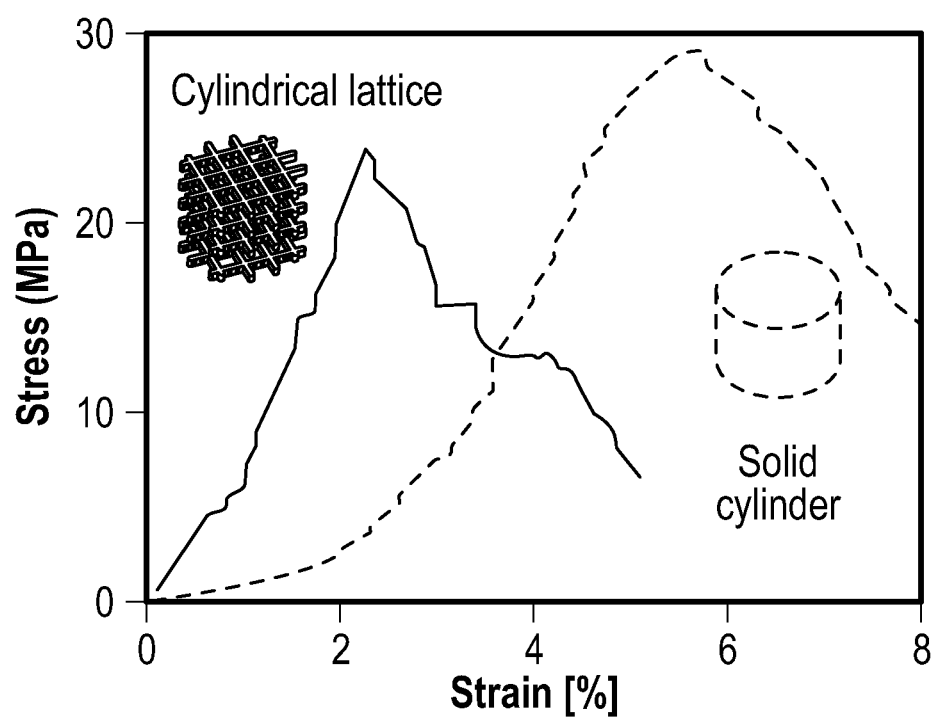
FIG. 9 is a stress vs. strain graph for a structural material, according to one or more embodiments.

As shown in FIG. 9 and summarized in the table below, sintered carbohydrates are stiff and brittle under compression, making them self-supporting and amenable to extensive handling, multiple coating steps, and casting inside viscous pre-polymer solutions.

FIG. 9 depicts a graph of stress (in megapascal (MPa)) versus strain (in percent elongation (%)) collected during uniaxial compression for a solid carbohydrate cylinder and a macroporous carbohydrate cylinder according to an embodiment of this method. FIG. 9 also depicts a schematic of each geometry as an inset located adjacent to the corresponding stress vs strain curve. Young's modulus (in MPa) was measured as the slope of the stress-strain curve in the linear region, yield stress (in MPa) was measured as the peak stress value before failure, and yield strain (%) was measured as the corresponding strain. The accompanying results in the table summarize n=11 solid cylinders and 9 cylindrical lattices fabricated across three independent print runs.

|  | Solid Cylinder | Cylindrical Lattice |
| --- | --- | --- |
| Young's Modulus (MPa) | 580 ± 200 | 640 ± 280 |
| Yield Stress (MPa) | 19 ± 9.0 | 30 ± 4.9 |
| Yield Strain (%) | 6.9 ± 1.4 | 2.9 ± 0.7 |

A three-dimensional structure, solidified according to one or more embodiments, may be able to support its own weight and may be brittle and stiff. In some embodiments, a three-dimensional structure fabricated of the structural material may have a Young's modulus in the range from 200 MPa to 1000 MPa, (for example, in the range from 500 MPa to 1000 MPa, in the range from 500 MPa to 700 MPa), for example approximately 600 MPa.

In some embodiments, a three-dimensional structure formed of a structural material may take the form of a filament network that may be formed of a plurality of filaments, a three-dimensionally branched pattern, an interpenetrating geometry, and/or an unsupported geometry.

The materials and/or methods, according to one or more embodiments of this disclosure, may be applied to fabricate a three-dimensional structure and thus a final geometry that may include various freeform structures and/or patterned fluidic networks.

The structural material may be capable of dissolving and/or disintegrating upon interaction with a liquid, according to one or more embodiments. In some embodiments, the liquid may include, but is not limited to, or may utilize one or more of, water, saline, or phosphate buffered saline (PBS). After solidification, the three-dimensional structure may be ready for use as a template for sacrificial templating, according to one or more embodiments discussed below.

The three-dimensional structure may be environmentally stable such that it may be stored for multiple weeks before use in sacrificial templating, in one or more embodiments.

Surface Smoothing, Per One or More Embodiments

Following SLS according to embodiments of this disclosure, the surfaces of a three-dimensional structure may initially have a high surface roughness. This surface roughness may be due, in part, to decoration of the three-dimensional structure with loosely attached granules of the powder. To remove these loosely attached granules and/or to reduce the surface roughness, the three-dimensional structure may undergo surface smoothing with a smoothing solution. The smoothing solution may include one or more carbohydrates. The smoothing solution may include solvent(s). Contact between the smoothing solution and the three-dimensional surface may be tailored. Following surface smoothing according to some embodiments, the surface roughness of the three-dimensional structure may be decreased due to a smoother surface topography. In some embodiments, surface smoothing may alter the size and/or the mass of the three-dimensional structure. Some embodiments of the surface smoothing may deposit an additional carbohydrate coating on the outside of the three-dimensional structure. Aspects of the smoothing solution are detailed below.

In some embodiments, the smoothing solution may include a carbohydrate. The carbohydrate used for the smoothing solution may include, but is not limited to, isomalt, dextran, sucrose, glucose, lactose, trehalose, maple syrup, and/or sugar cane syrup, in some embodiments. Additionally, some embodiments of the smoothing solution may include two or more carbohydrates. The carbohydrate(s) used in the smoothing solution may or may not be in the powder used to fabricate the three-dimensional structure to be treated.

The smoothing solution according to some embodiments may include one or more solvents. The solvent may include, but is not limited to, water and/or an organic solvent, in one or more embodiments.

In some embodiments, the smoothing solution may have a sufficiently high concentration of the one or more carbohydrates included in the smoothing solution such that the smoothing solution does not dissolve or undesirably alter the three-dimensional structure.

The three-dimensional structure may be contacted with the smoothing solution via a washing, spraying, or dipping method, in some embodiments. Contact between the three-dimensional structure and the smoothing solution may continue for a contact time. In some embodiments, contact time and/or contact method may be tailored so the contact is sufficient to remove the loose granules and smooth the surface of the three-dimensional structure. In some embodiments, contact time and/or contact method may be tailored so the contact does not dissolve or undesirably alter the three-dimensional structure.

Figure 10B:
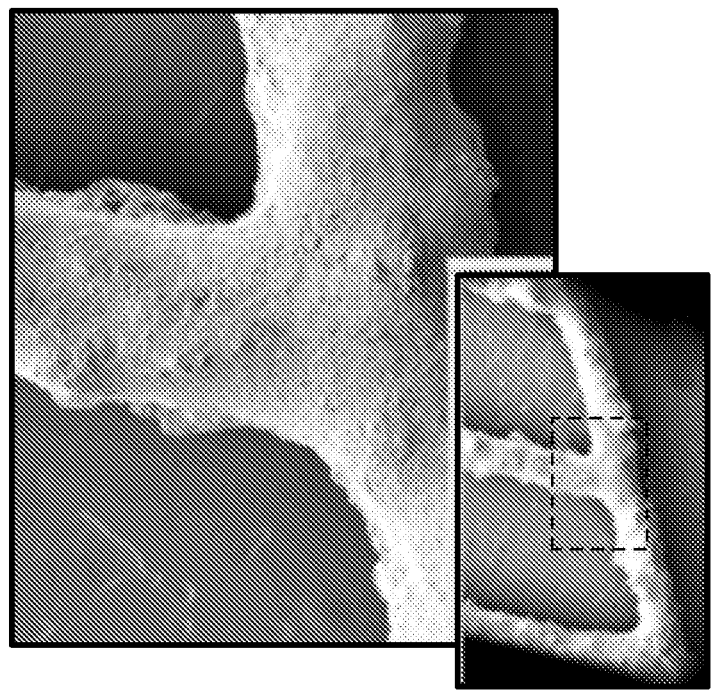
FIGS. 10A and 10B are scanning electron micrographs of a filament network surface, according to one or more embodiments.
Figure 10A:
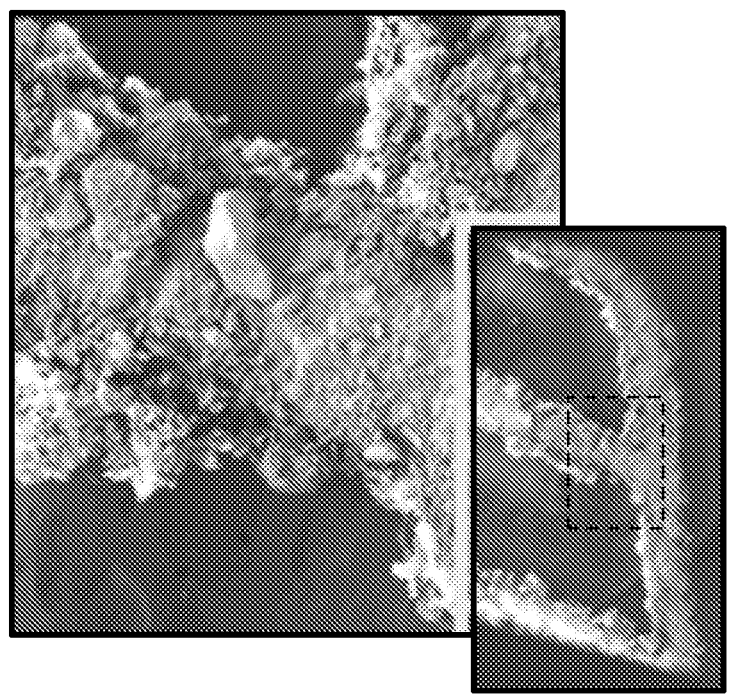

For example, FIGS. 10A and 10B are scanning electron micrographs of a three-dimensional structure formed via SLS before surface smoothing (FIG. 10A) and after surface smoothing (FIG. 10B) according to embodiments herein.

FIG. 10A is a scanning electron micrograph of a three-dimensional structure having a shape of a filament formed via SLS of a powder according to one or more embodiments discussed previously. Upon visual inspection, FIG. 10A shows significant surface roughness. This surface roughness may be due to partially fused powder granules decorating the surface. The scale bars are 200 μm (magnified view) and 1 mm (inset).

FIG. 10B is a scanning electron micrograph of the same filament after surface smoothing with a smoothing solution. Specifically, the filament depicted in FIG. 10A was treated with a smoothing solution consisting of a concentrated isomalt solution (60 weight percent (wt %) isomalt in water), according to embodiments of this disclosure. Following surface smoothing, the filament was re-imaged as FIG. 10B. Upon visual inspection, FIG. 10B shows low to moderate surface roughness. As in FIG. 10A, the scale bars for FIG. 10B are 200 μm (magnified view) and 1 mm (inset).

In one or more embodiments, the surface smoothing may leave the three-dimensional structure largely intact. In one or more embodiments, surface smoothing may not significantly alter the overall architecture. In one or more embodiments, surface smoothing may not significantly bridge across regions of the three-dimensional structure. In one or more embodiments, the surface smoothing may decrease surface roughness. In one or more embodiments, the surface smoothing may remove loose granules of the powder from the three-dimensional structure. The above features are evidenced by comparing the micrographs of a filament taken before (FIG. 10A) and after (FIG. 10B) surface smoothing according to some embodiments. Specifically, comparing FIGS. 10A and 10B shows surface smoothing decreasing the surface roughness without significantly altering the overall architecture or bridging across filaments.

Figure 11A:
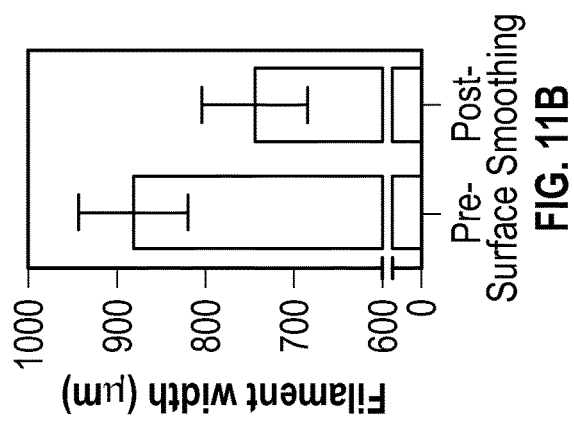
FIGS. 11A-11D are graphs of the impacts of surface smoothing, according to one or more embodiments.
Figure 11B:
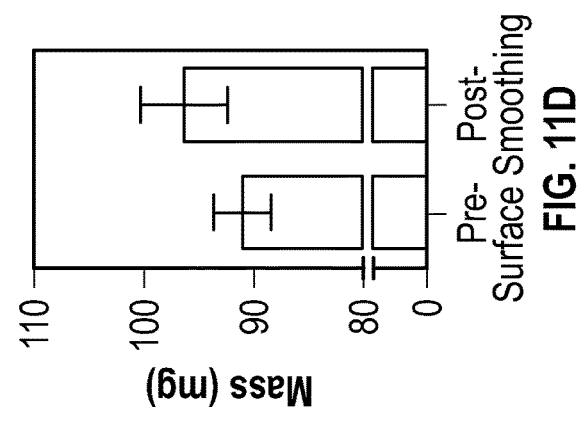
Figure 11C:
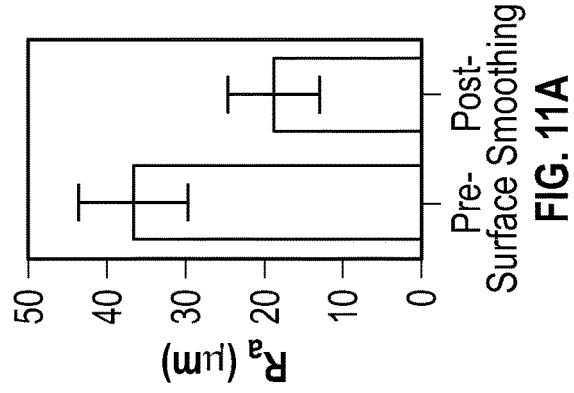
Figure 11D:
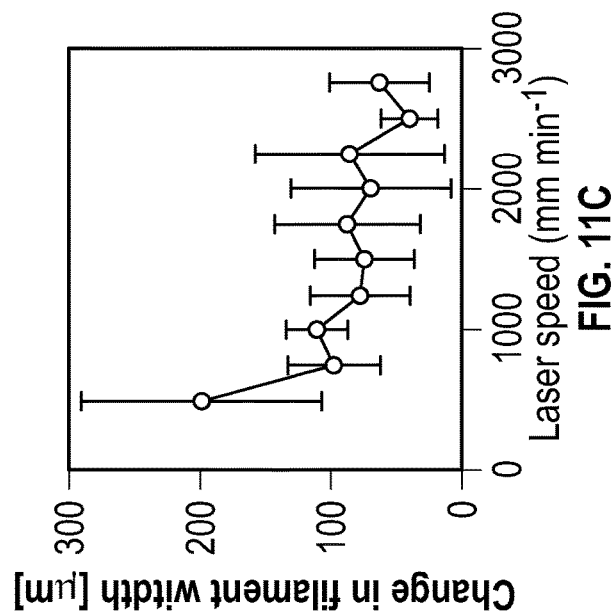

In addition to the visually evident improvement of the filament surface roughness seen in FIGS. 10A and 10B, some embodiments of the surface smoothing may alter the filament in one or more of the following quantifiable ways: reducing the surface roughness, reducing the filament width, or increasing the filament mass. FIGS. 11A-11D numerically depict the impacts of surface smoothing on surface roughness ($R_a$) (FIG. 11A), filament width (FIGS. 11B and 11C), and filament mass (FIG. 11D), according to embodiments of this disclosure. The data depicted in FIGS. 11A, 11B, and 11D is the mean±standard deviation, for n=9 (FIG. 11A), n=24 (FIG. 11B), and n=7 (FIG. 11D). For FIGS. 11A and 11B, $p<0.001$ for a paired t-test. For FIG. 11C, $p<0.01$ for a paired t-test.

Some embodiments of the surface smoothing may result in a reduced average surface roughness. To that end, FIG. 11A shows a nearly two-fold reduction of $R_a$ for filaments following surface smoothing according to embodiments of this disclosure.

Some embodiments of the surface smoothing may result in a reduced size of the three-dimensional structure. In some embodiments, as in FIG. 11B, such a size change may reflect measurements of the width of a filament before and after surface smoothing. To that end, FIG. 11B shows a reduction of the filament width of between 100 µm and 200 µm following surface smoothing according to embodiments of this disclosure. Some embodiments may deploy alternative metrics to quantify the size change that may depend on the geometry of the three-dimensional structure. Furthermore, FIG. 11C is a graph of the change in filament width (in µm) from surface smoothing as a function of laser speed (in mm/min). FIG. 11C shows that surface smoothing reduces the diameter of filaments by an approximately constant amount, roughly 100 µm.

Some embodiments of the surface smoothing may result in an increased mass of the three-dimensional structure. To that end, FIG. 11D shows an increase of the filament mass of between 10% and 20% following surface smoothing according to embodiments of this disclosure.

In some embodiments, surface smoothing may deposit an additional carbohydrate coating on the outside of the three-dimensional structure. This added carbohydrate coating may have the same or a different composition compared to the three-dimensional structure prior to surface smoothing.

In some embodiments, the three-dimensional structure may undergo surface smoothing via exposure to the smoothing solution as discussed above before undergoing further steps. In other embodiments, the three-dimensional structure may not have undergone surface smoothing before undergoing further steps. A three-dimensional structure, according to one or more embodiments, may or may not further include a smoothed surface as described above.

Surface Coating, According to One or More Embodiments

To prevent premature dissolution of a three-dimensional structure and/or to establish a barrier between the three-dimensional structure and cells that may be included in a matrix material, one or more embodiments of the method include surface coating the three-dimensional structure with a surface coating material. Therefore, according to one or more embodiments, the three-dimensional structure may further include the surface coating material. Such a surface coating material may coat the surface without backfilling the space between regions of the three-dimensional structure and/or substantially changing the shape of the three-dimensional structure. In one or more embodiments, the surface coating material may not significantly backfill the void space. Aspects of the surface coating are detailed below.

In one or more embodiments, the surface coating material may include a polymer solution. The polymer solution may include, but is not limited to, polycaprolactone, poly(L-lactide), polylactic acid, poly(lactic co-glycolic acid), an amphiphilic co-polymer including a member of the Pluronic family, an amphiphilic co-polymer comprising an ester- or ether-derivative of a poly(ethylene glycol) molecule, collagen, gelatin, zein, ghee, shellac, a starch, wax, or petroleum jelly. In one or more embodiments, the surface coating material may include one or more polymer solutions.

Some embodiments of the surface coating material may include one or more solvents. In one or more embodiments, the surface coating material may include dichloromethane and/or chloroform.

In some embodiments, the surface coating may be applied, for example, by a dipping method (dip+solvent evaporation), among other coating techniques.

Some embodiments of the surface coating material may be a hydrophobic material. In some embodiments, the surface coating material may include a hydrophobic polymer as a surface coating. The hydrophobic polymer may include, but is not limited to, polycaprolactone, poly(l-lactide), polylactic acid, poly(lactic co-glycolic acid), collagen, gelatin, zein, shellac, a starch, wax, or petroleum jelly. The surface coating may include one or more hydrophobic polymer. The hydrophobic polymer may be dissolved in one or more solvents, such as dichloromethane and/or chloroform.

In other embodiments, the surface coating material may be an amphiphilic material, including both hydrophilic and hydrophobic functional groups. The amphiphilic material may include, but is not limited to, the amphiphilic materials included above, such as pluronics (block co-polymers of poly(propylene oxide) and poly(ethylene oxide)) and hydrophobic molecules conjugated to poly(ethylene glycol) (PEG), such as PEG-stearate, PEG-oleate, PEG-laurate, PEG-castor oil, or PEG-myristate. The surface coating may include one or more amphiphilic material. The amphiphilic material may be dissolved in one or more solvents, such as dichloromethane (DCM) and/or chloroform. Such a solvent may be used for dip coating, for example.

In some embodiments, the three-dimensional structure may undergo surface coating via exposure to the surface coating material as discussed above before undergoing further steps. In other embodiments, the three-dimensional structure may not have undergone surface coating before undergoing further steps. A three-dimensional structure, according to one or more embodiments, may or may not further include a surface coating as described above.

A three-dimensional structure, solidified, (optionally) surface smoothed, and (optionally) surface coated according to one or more embodiments, may be brittle and stiff, and thus may continue to be able to support its own weight. The three-dimensional structure may be sufficiently environmentally stable to be stored for multiple weeks before use, in one or more embodiments. Following solidification, (optional) surface smoothing, and (optional) surface coating, the three-dimensional structure may be used as a template for sacrificial templating, according to one or more embodiments discussed below.

Backfilling a Void Space, According to Embodiments

Next, a three-dimensional structure may be encased in a matrix material by surrounding the three-dimensional structure with a matrix material and allowing the matrix material to solidify. Thus, the void space of the three-dimensional structure may be backfilled with the matrix material. In some embodiments, this three-dimensional structure may be serving as a template for the SLS-CaST method. Aspects of the back filling are detailed below, and examples are presented further in FIGS. 12A-12F.

In some embodiments, the matrix material may be an orthogonal bulk material. In some embodiments, the matrix material may be any of a biomaterial, an elastomer, a plastic, a hydrogel, a biomaterial, a silicone, or some other curable material, or a mixture of one or more of these materials.

Some embodiments of the matrix material may be an elastomer and/or a plastic which, according to some embodiments, may include polydimethylsiloxane, polycaprolactone foam, epoxy-based matrices, or monomers, dimers, or oligomers of any of those materials. In one or more embodiments, the elastomer and/or plastic may include one or more of these elastomers and/or plastics.

Some embodiments of the matrix material may be a biomaterial which, according to some embodiments, may include polyamide, poly(2-hydroxy ethyl methacrylate), poly(vinyl alcohol), polyacrylamide, poly(ethylene glycol), a polyurethane, collagen, agarose, albumin, alginate, chitosan, starch, hyaluronic acid, gelatin, fibrin, matrigel, glycerol, glycol, mannitol, inositol, xylitol, adonitol, glycine, arginine, biological polymeric molecules, albumin, peptide amphiphiles, or monomers, dimers, or oligomers thereof. In one or more embodiments, the biomaterial may include one or more of these biomaterials. Some embodiments of such a biomaterial may be a crosslinked biomaterial following solidification.

In one or more embodiments, the biomaterial may be in solution and thus the matrix material may further include a solvent. In some embodiments, the solvent may be water or saline.

In some embodiments, the matrix material may be an aqueous solution of at least one biomaterial. In some embodiments, this aqueous solution may further include a suspension of living cells.

In one or more embodiments, the vascular network may be formed from two or more matrix materials, each matrix material occupying a distinct region of the void space. For example, layers of dissimilar materials may be cast one atop another. An example of such embodiments is detailed further.

In one or more embodiments, the vascular network may be formed from matrix material(s) that include two or more types of living cells, each cell type occupying a distinct region of the void space. An example of such embodiments is detailed further.

In one or more embodiments, the matrix material and the surface coating material may be dissimilar materials. In alternative embodiments, the matrix material and the surface coating material may be similar materials or the same material.

In some embodiments, the method may be compatible with cell-laden materials without adversely affecting the viability of encapsulated cells. Thus, some embodiments of the method may be employed without the use of cytotoxic reagents or conditions, in one or more embodiments. Further, in some embodiments, the matrix material, the structural material, the (optional) smoothing solution, and the (optional) surface coating material may be compatible with cell-laden materials without adversely affecting the viability of encapsulated cells. In some embodiments, the matrix material and/or the surface coating material may include living cells. Experiments described below showed that not only are cells metabolically active near patterned vessels formed via embodiments of this disclosure, but the cells proliferate in the regions near the vessels over time.

Solidifying a Matrix Material, According to Embodiments

While some embodiments may employ a matrix material that solidifies merely with the elapsing of time and thus may not require additional treatment steps, other embodiments may utilize a matrix material that solidifies following additional solidification treatment. The additional solidification treatment may include, but are not limited to, one or more of catalyst addition, photo curing, thermal curing, and enzymatic curing. The additional solidification treatment may cause the matrix material to cros slink, branch, network, or otherwise chemically or physically change so as to solidify the matrix material and/or to improve its stiffness, strength, toughness, hardness, resilience, and/or durability. In some embodiments, solidifying the matrix material (including any additional solidification treatment) may be successfully completed when the matrix material has a template formed of a structural material disposed or embedded within. Aspects of the matrix solidification are detailed below.

Some embodiments may employ a matrix material that solidifies merely with the elapsing of time. Some such embodiments may not require additional treatment steps to solidify the matrix material. The exact solidification mechanism of such an embodiment may include, but is not limited to, one or more of chemical reaction within the matrix material and solvent evaporation.

Some embodiments may employ catalyst addition for solidification of the matrix material. Some such embodiments may require mixing a catalyst with the matrix material prior to curing.

Some embodiments may employ photo curing (also called photopolymerization) for solidification of the matrix material. In some embodiments, the electromagnetic radiation used for photo curing may include visible light or ultraviolet light (UV). Despite the opacity of a template formed of the structural material, according to one or more embodiments described above, photo curing may be successfully employed around the template to solidify a matrix material via photopolymerization, such as polyethylene glycol diacrylate (PEGDA).

Some embodiments may employ thermal curing (also called thermal polymerization) for solidification of the matrix material. According to one or more embodiments, thermally crosslinked matrix materials, like agarose, may be compatible with SLS-CaST.

Some embodiments may employ enzymatic curing for solidification of the matrix material. Some such embodiments may require mixing an enzyme with the matrix material prior to curing. Prior work has shown that enzymatically polymerized silk fibroin and fibrin gels are difficult to pattern using extrusion. However, matrix materials requiring enzymatic polymerization, such as silk fibroin and fibrin, may be fully compatible with the SLS-CaST method, according to one or more embodiments of this disclosure.

Other additional solidification treatments to solidify and/or crosslink matrix materials may also be compatible with the SLS-CaST method.

Removing a Template, According to Embodiments

Following solidification of a matrix material around a three-dimensional structure that may be formed of a structural material, in one or more embodiments, the three-dimensional structure may be removed from within the matrix material. This removal may create open cavities within the matrix material in the shape of the three-dimensional structure, forming a perfusable compartment within the matrix material. In such a case, the three-dimensional structure here may be serving as a template. The structural material may be formed via embodiments of an SLS method as described above.

Removal of the template from within the matrix material may be performed by dissolution and/or degradation of the structural material with a liquid, according to one or more embodiments. In some embodiments, the liquid may include, but is not limited to, or may utilize one or more of, water, saline, or phosphate buffered saline (PBS).

In some embodiments, the step of removing the template may not damage living cells within the matrix material.

Incorporation of Cells within Sacrificially Templated Matrix Materials, According to Embodiments The paradigm of sacrificial templating decouples three-dimensional printing from cell handling. Laser-sintered filament networks may thus be used to pattern perfusable vascular networks in a range of matrix materials including natural and synthetically derived biocompatible hydrogels, which can support cells in both the lumenal (that is, along the interior surface of a vessel) and parenchymal (that is, outside the vessel, comprising the bulk of the tissue) spaces.

In some embodiments, parenchymal cells may be incorporated homogeneously into the interconnected vascular network. Some such embodiments may be formed by mixing the cells into the matrix material prior to solidification, for example by mixing cells into the pre-hydrogel solution.

In some embodiments, regions of the vascular network proximate to the flow path may be seeded with endothelial cells. Some such embodiments may be formed by injecting a dense cell suspension (for example, $30 \times 10^6$ cells per ml) into the interconnected vascular network. In some embodiments, the interconnected vascular network may be rotated to coat all flow paths after the cell suspension is injected into the interconnected vascular network. In such an embodiment, endothelial cells (for example, human umbilical vein endothelial cells (HUVECs)) may adhere to the lumenal surfaces of the vascular network and form a monolayer along each flow path.

Both healthy and diseased tissues in the body are characterized by spatially defined zones of cells and extracellular matrix (ECM). For example, the musculoskeletal system contains interfaces between bone, cartilage and tendon injured tissues may have regions of fibrous scar tissue and tumors within tissues have distinctive microenvironments of cells and ECM. Parenchymal fibroblast culture alongside lumenal endothelial cells is a relevant model because of the crucial role played by such stromal cells in stabilizing the self-assembly of endothelial cells into higher-order structures, such as a putative capillary network. Thus, some embodiments may include interconnected vascular networks that have spatially heterogeneous configurations of cells and matrix materials.

Some embodiments may include both parenchymal and endothelial cells. In some embodiments, parenchymal cells may be incorporated homogeneously by mixing the cells into the matrix material prior to solidification followed by the incorporation of endothelial cells by flowing cell laden fluid through the vascular network after formation.

In one or more embodiments, the vascular network may be formed from two or more matrix materials, each matrix material occupying a distinct region of the void space. Each of the matrix material may or may not be seeded with one or more type of parenchymal cells.

In an example, independent seeding of lumenal (HUVEC (GFP)) and parenchymal (IMR-90 fibroblast (Histone 2B (H2B)-mOrange2), $2.5 \times 10^6$ per milliliter ($mL^{-1}$)) cell populations was demonstrated for a dendritic vascular network patterned within a gelatin methacrylate (GelMA; 10 wt %) matrix material.

Following 11 days of perfusion culture (with ramped flow rate), the endothelial layer was stable, well maintained, and showed formation of putative endothelial sprouts growth into the fibroblast-laden parenchymal compartment. Additionally, uniform interstitial seeding of IMR-90 fibroblasts was seen. Partial confocal florescence microscopy further demonstrated HUVEC seeding across a series of channel bifurcations in the dendritic network. HUVECs are well-distributed across the central channels of the network and around the circumference of individual channels. Thus, the endothelialized channels demonstrated uniform coverage of endothelial cells across the various branches of the network and around the full circumference of the channels.

In addition to seeding cells homogeneously in the parenchymal zone, embodiments may include a combination of strategically sequential gel polymerizations, discrete cell populations, and discrete matrix materials to form a single, spatially patterned interconnected vascular network. Such an interconnected vascular network with a spatially heterogeneous configurations of cells and materials may be useful for applications such as interfacial tissue engineering or screening assays performed under perfusion culture.

For example, transitioning zones of extravascular tissue were cast along a shared vascular network to form a monolithic and perfusable construct. Control over spatial tissue patterning was demonstrated by seeding a bottom zone containing cancer aggregates (344SQ (H2B-mVenus)); 15,000 aggregates $ml^{-1}$) with fibroblasts (IMR-90 (H2B-mOrange2); $5 \times 10^6$ ml-1) in photopolymerized GelMA (10 wt %), a middle zone containing fibroblasts ($10 \times 10^6$ $ml^{-1}$) alongside endothelial cells (HUVEC (GFP); $5 \times 10^6$ $ml^{-1}$) in GelMA (7.5 wt %) mixed with fibrin (10 mg $ml^{-1}$), and a top zone containing endothelial cells ($15 \times 10^6$ $ml^{-1}$) with supporting fibroblasts ($5 \times 10^6$ $ml^{-1}$) in enzymatically polymerized fibrin (20 mg $ml^{-1}$). Images of the individual fluorescence channels showed well-defined interfaces between zones and multiday perfusion through the branched vascular network indicated channel patency and robust lamination between layers.

Examples of Matrix Materials in SLS-CaST, According to Embodiments

FIGS. 12A-12F photographs depicting similarly shaped channels within multiple matrix materials of varying compositions, stiffnesses, and/or solidification mechanisms formed using an SLS-CaST method according to one or more embodiments. Here, the SLS-CaST procedure employed a single template design in the shape of a filament network in order to form channels that form an interconnected vascular network through each of these matrix materials. Each of the matrix materials was backfilled and solidified around the template, after which the template was dissolved, according to embodiments described above. FIGS. 12A-12F highlight the interconnected vascular network through each matrix material by perfusing the interconnected vascular network with blue dye. Perfusion through the patterned channel network, as seen in FIGS. 12A-12F, may demonstrate channel patency and connectivity of the interconnected vascular network within each matrix material. Furthermore, FIGS. 12A-12F depict a variety of solidified matrix materials having a variety of solidification methods. Sample fabrication details are discussed further.

FIGS. 12A and 12B depict an interconnected vascular network within a stiff elastomer or a plastic, specifically polycaprolactone (PCL) foam in FIG. 12A and polydimethylsiloxane (PDMS) in FIG. 12B (scale bar=5 mm), according to one or more embodiments. Thus, stiff elastomers or plastics may be used as matrix materials for the SLS-CaST method, according to embodiments of this disclosure. Channels patterned within stiff elastomers or plastics, according to one or more embodiments, may have application for imaging phantoms, as microfluidic devices, or as scaffolds for bone tissue engineering.

FIGS. 12C-12F depict an interconnected vascular network within matrix materials including an array of natural and synthetically-derived hydrogels (e.g., biomaterials) of varying stiffnesses and solidification mechanisms, according to one or more embodiments. Thus, natural or synthetically-derived hydrogels may be used as matrix materials for the SLS-CaST method, according to embodiments of this disclosure. These embodiments highlight the versatility of SLS-CaST for fabricating interconnected vascular network from matrix materials with a range of crosslinking mechanisms, mechanical properties, and cell-matrix interactions. Specifically, the hydrogel utilized in FIG. 12C is PEGDA, in FIG. 12D is agarose, in FIG. 12E is silk fibroin, and in FIG. 12F is fibrin, according to embodiments of this disclosure.

Interconnected vascular networks within biomaterials, according to some embodiments, may be used as perfusable model tissues. Thus, each interconnected vascular network depicted in FIGS. 12C-12F was formed within the biomaterial without the use of cytotoxic reagents or conditions. In one or more embodiments, the biomaterial through which an interconnected vascular network may be formed may further contain a suspension of living cells.

Furthermore, FIGS. 12A-12F depict matrix materials that employed different additional solidification treatments according to embodiments herein. FIG. 12A is an embodiment of this disclosure where the matrix material (polycaprolactone (PCL)) was initially prepared to include a solvent (chloroform) that solidified during an overnight cure largely via solvent evaporation. In FIG. 12B, the matrix material (PDMS) was initially prepared with an included catalyst and solidified during a 48-hour cure according to embodiments of this disclosure. FIG. 12C shows an embodiment of this disclosure where photopolymerization was successfully performed to crosslink PEGDA via photopolymerization using incident light from various angles. FIG. 12D shows an embodiment of this disclosure where thermal curing was successfully employed to crosslink agarose via exposure to increased temperature. Finally, FIGS. 12E and 12F depict patterned channels formed within silk fibroin and fibrin, thus illustrating successful enzymatic polymerization on a matrix material that backfills around a template, according to embodiments of this disclosure. Because the matrix material is opaque, the vascular network formed using PCL FIG. 12A was imaged with micro-computerized tomography (µCT). Contrastingly, the vascular networks formed of various transparent matrix materials were perfused with a blue liquid and photographed (FIGS. 12B-12F).

Complex Channel Architectures Fabricated Via SLS-CaST, According to Embodiments

One or more embodiments herein may also pattern more complex channel configurations encompassing some of the salient architectural motifs of native, mammalian vascular networks. Referring now to FIGS. 13-16, hierarchically-branched, interconnected vascular networks are shown according to one or more embodiments. Each of FIGS. 13-16 were formed using an SLS-CaST method discussed above from a matrix material of 2 wt % low-melt agarose, according to one or more embodiments. Furthermore, in some embodiments, the matrix material may define an interconnected vascular network having multiple, fluidly independent flow paths. FIGS. 17A-17D depict such an interconnected vascular network having two flow paths. Further details of the fabrication method for the substantially interconnected vascular networks in FIGS. 13-17 are discussed further.

Figure 13D:
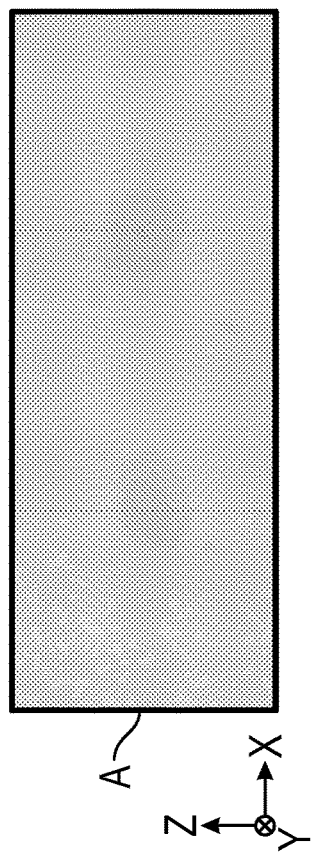
Figure 13E:
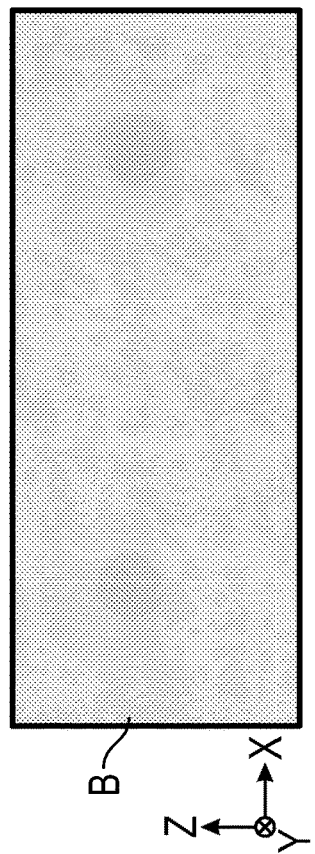

While axial tapering of channels is non-trivial for extrusion-based printing, it may be readily incorporated into sintered carbohydrate templates and thus realized downstream in interconnected vascular networks formed within the matrix materials, according to one or more embodiments. To that end, FIGS. 13A-13E depict an embodiment of an interconnected vascular network within a matrix material that has tapered channels and a smooth curvature. FIG. 13A depicts a perspective view schematic of the substantially interconnected vascular network including two planes indicating the locations of two cross-sections. The interconnected vascular network is 10 mm by 20 mm by 4 mm with a volume of 800 microliters (µL). Cross section planes A and B are also indicated. FIG. 13B is a perspective view photograph of the filament network fabricated via SLS for use as a template. FIG. 13C is a photograph of a top view of the resulting interconnected vascular network showing a scale bar=2 mm. FIG. 13D is a photograph of a cross section taken at plane A and FIG. 13E is a photograph of a cross section taken at plane B. Cross-sections of the matrix material at the indicated planes in FIGS. 13C and 13D show channels with a circular profile. Cross sections of the matrix material at the indicated planes shows channels with a circular profile that become smaller in diameter as they approach the center of the matrix material. This variation can be seen by comparing the cross section originating closer to the center of the matrix material (FIG. 13D) to the cross section originating further from the center of the matrix material (FIG. 13C). that become smaller in diameter as they approach the center of the matrix material.

Figure 14B:
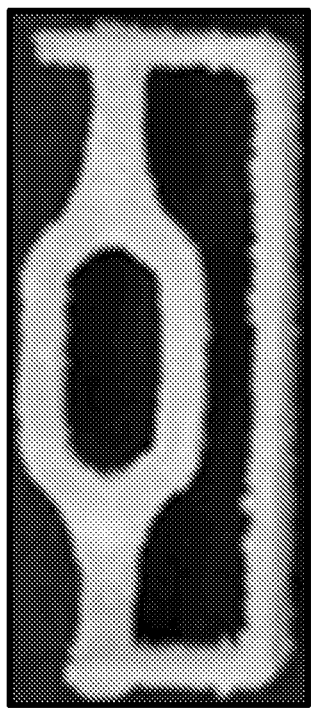
Figure 14C:
Figure 14A:
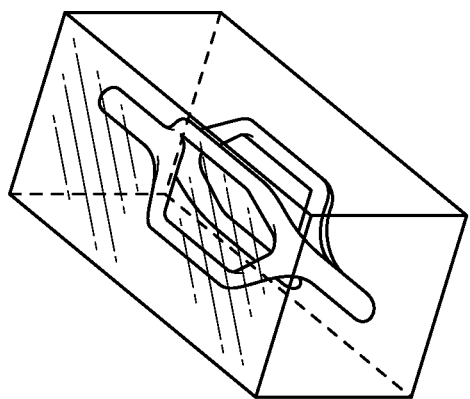

With existing extruded sacrificial templates, filament intersections require depositing one filament atop another (i.e., in separate planes, requiring redundant material dispensing). Therefore, inter-vessel junctions patterned with extruded templates retain this stacked, log cabin morphology, which is markedly different from native inter-vessel junctions. In contrast, according to one or more embodiments, SLS templates may offer seamless branching transitions even for junctions between many adjoining channels. Accordingly, FIGS. 14A-14E depict an embodiment of a three-dimensional interconnected vascular network demonstrating a smooth transition from a single inlet and a single outlet to four daughter branches. FIG. 14A depicts a perspective view schematic of such a substantially interconnected vascular network. The interconnected vascular network is 7 mm by 13 mm by 7 mm with a volume of 650 µL. FIG. 14B is a top view photograph of the filament network fabricated via SLS for us as a template. FIG. 14C is a perspective view photograph of the resulting substantially interconnected vascular network showing a scale bar=5 mm. FIG. 14D is a photograph depicting the top view of the same vascular network. FIG. 14E is a photograph of a cross section taken through the four daughter branches near the center of the vascular network. FIG. 14E clearly shows a separate, round channel for each of the four daughter branches.

In some embodiments, SLS-CaST may be used to produce interconnected vascular networks with hierarchical channel branching in all three dimensions as depicted in FIGS. 15A-F and 16A-F. In contrast, neither multiple branching iterations nor suspended overhanging geometry are readily produced via existing extrusion printing processes. Such embodiments may be useful, for example, for replicating mammalian vasculature. For such an embodiment, the carbohydrate templates to produce the architectures of these examples may require one or more of: unsupported overhangs and/or underhangs, bifurcations, or curved channels oriented obliquely to the x-, y-, and z-axes of the template.

Figure 15A:
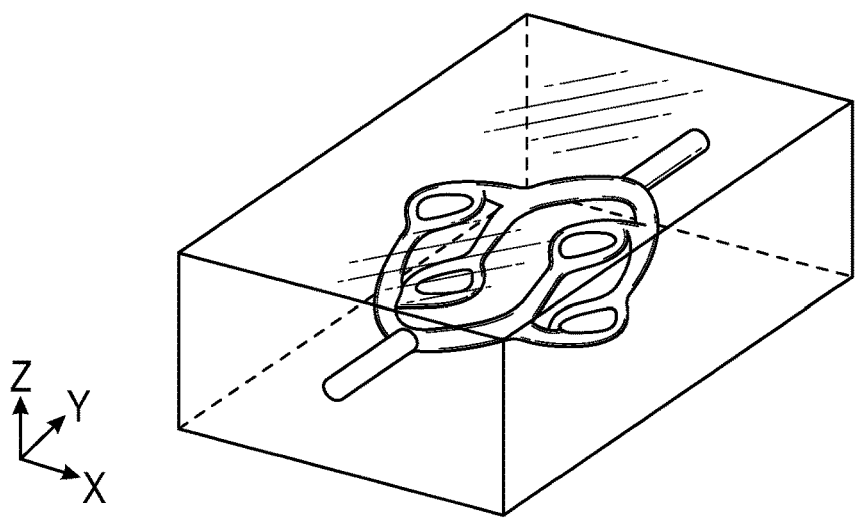
Figure 15B:
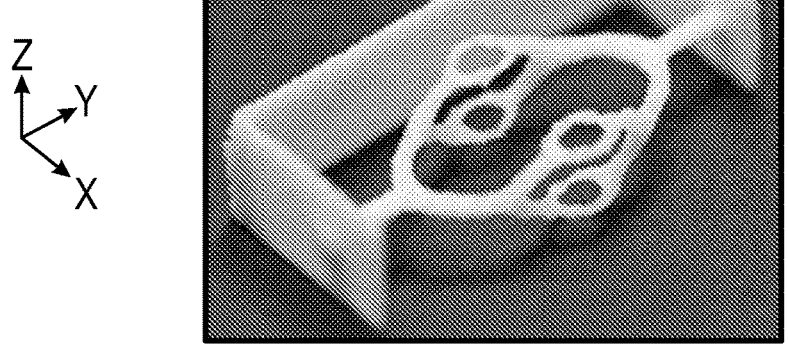
Figure 15C:
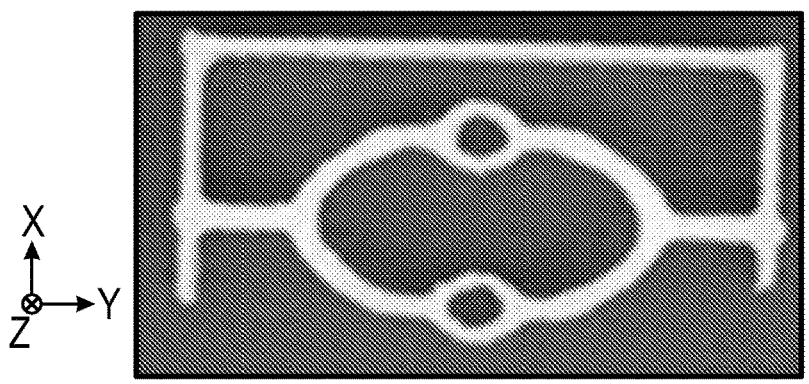

To that end, FIGS. 15A-15F depict an interconnected vascular network in the form of a three-dimensional hierarchical network that includes multiple branching iterations and suspended overhanging geometry, according to one or more embodiments. Accordingly, FIGS. 15A-15F depict an embodiment of a three-dimensional interconnected vascular network demonstrating eight daughter branching iterations with suspended overhanging geometry. FIG. 15A depicts a perspective view schematic of such a substantially interconnected vascular network. The interconnected vascular network is 16 mm by 25 mm by 8 mm with a volume of 3.2 milliliters (mL). FIGS. 15B and 15C are photographs depicting a perspective view and top view, respectively, of the filament network fabricated via SLS for us as a template. FIG. 15D is a perspective view photograph of the resulting substantially interconnected vascular network showing a scale bar=10 mm. FIGS. 15E and 15F are photographs depicting the top view and a side view, respectively, of the same vascular network.

Figure 16A:
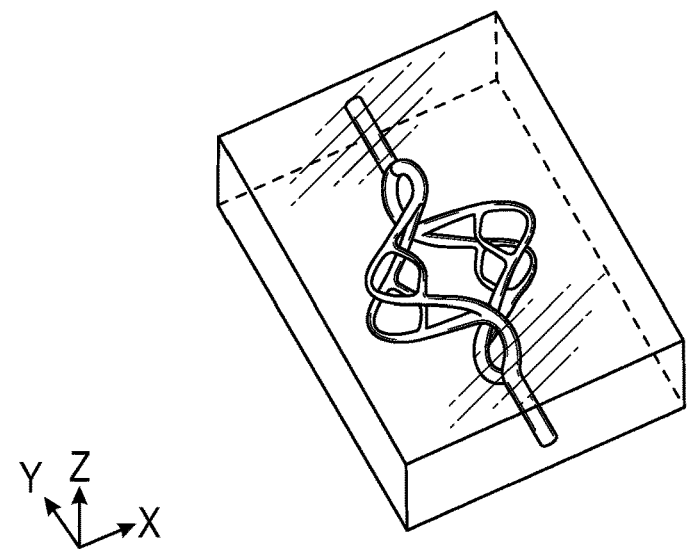
Figure 16B:
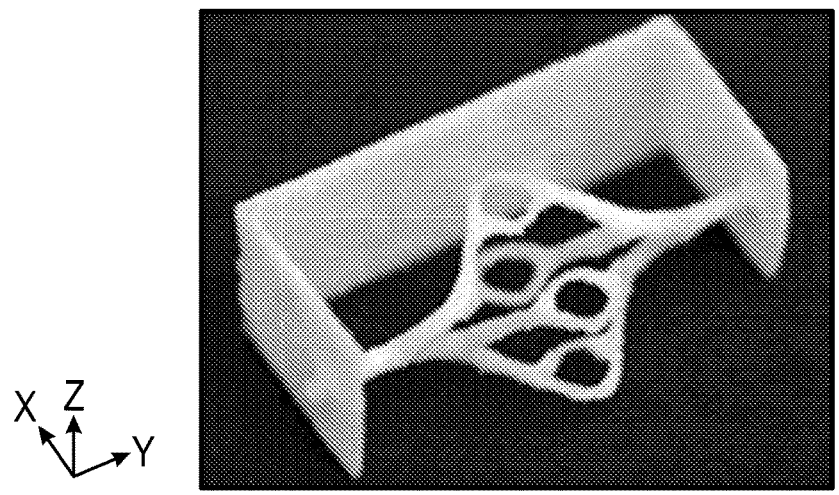
Figure 16C:
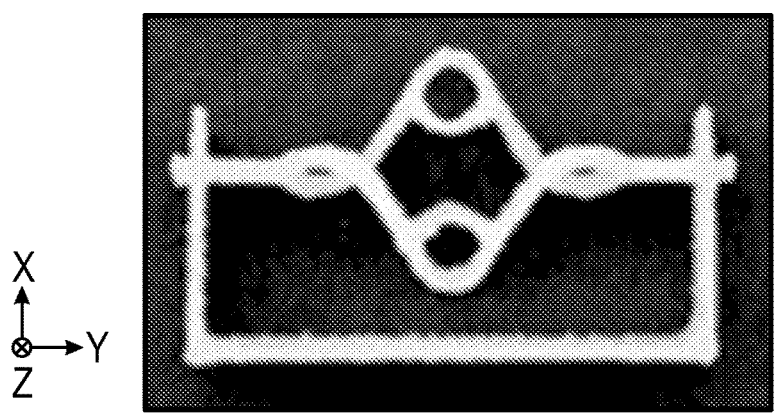

Additionally, FIGS. 16A-16F depict an interconnected vascular network having the shape of a twisted three-dimensional hierarchical network, according to one or more embodiments. Furthermore, the vascular network of FIGS. 16A-16F has smooth heterogeneous branch tapering across all three dimensions and a higher degree of channel tortuosity compared with FIGS. 15A-15D. FIG. 16A depicts a perspective view schematic of such a substantially interconnected vascular network. The interconnected vascular network is 16 mm by 25 mm by 10 mm with a volume of 4 mL. FIGS. 16B and 16C are photographs depicting a perspective view and top view, respectively, of the filament network fabricated via SLS for us as a template. FIG. 16D is a perspective view photograph of the resulting substantially interconnected vascular network showing a scale bar=10 mm. FIGS. 16E and 16F are photographs depicting the top view and a side view, respectively, of the same vascular network.

In some embodiments, a substantially interconnected vascular network may include multiple independent flow paths through the matrix material. Put another way, in some embodiments, the matrix material may define a substantially interconnected vascular network having two or more fluidly separated fluid paths. Such a substantially interconnected vascular network may be formed using a filament network that includes a plurality of filaments that serve as a template for multiple independent flow paths.

Some embodiments of such a vascular network may include a plurality of filaments that define multiple independent flow paths that are not entangled. Put another way, such a vascular network may include multiple independent flow paths, where each flow path is defined by a filament network, where the filament networks may be separated without breaking any of the filament networks. Such an embodiment may be formed by separately fabricating multiple filament networks via SLS and proximately positioning the filament networks immediately prior to solidification of the matrix material.

Some embodiments of such a vascular network may include multiple filament networks that define multiple independent flow paths that are "entangled," meaning the filament networks are geometrically linked and thus cannot be separated without breaking at least one of the filament networks. In some embodiments, forming such a substantially interconnected vascular network may include fabricating multiple, entangled filament networks via SLS and casting the vascular network in the matrix material. In some embodiments, the entangled filament networks may be fabricated so as to mirror their final arrangement in the interconnected vascular network prior to introduction of the matrix material.

Figure 17B:
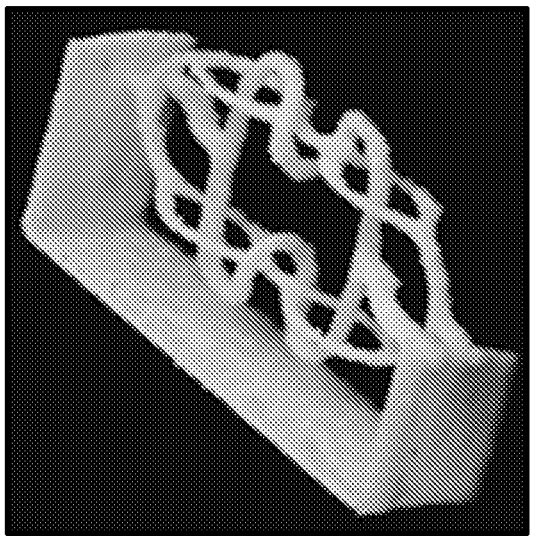
FIGS. 17A-17F depict an interconnected vascular network, according one or more embodiments.
Figure 17A:
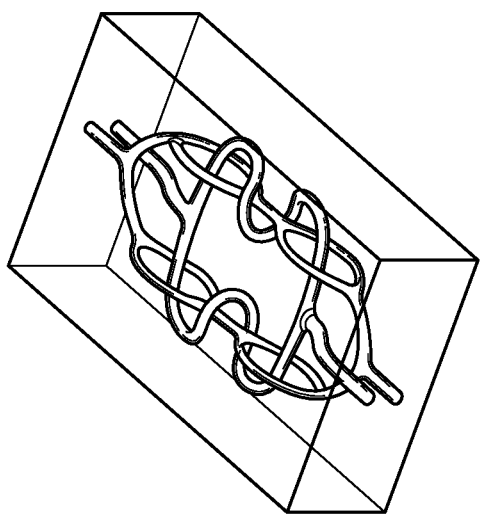
Figure 17C:
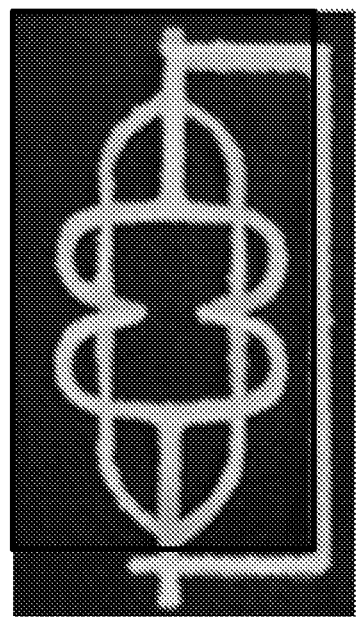
Figure 17D:
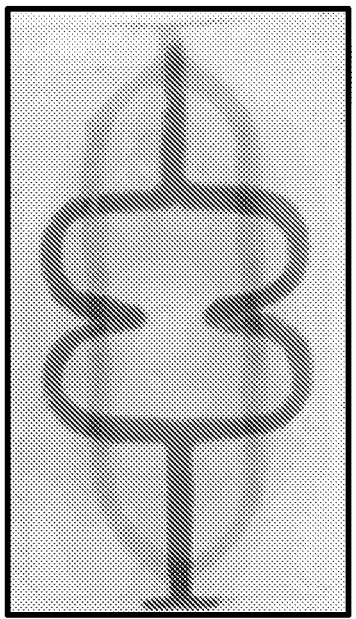
Figure 17E:
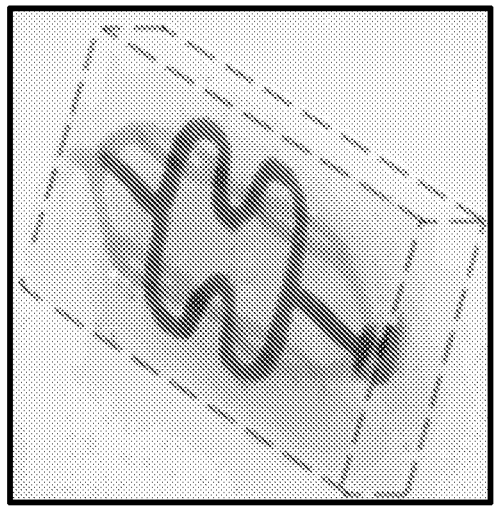
Figure 17F:

FIG. 17A depicts a perspective view schematic of such a substantially interconnected vascular network having two filament networks. The interconnected vascular network is 18 mm by 30 mm by 8 mm with a volume of 4.3 mL. FIGS. 17B and 17C are photographs depicting a perspective view and top view, respectively, of the filament network fabricated via SLS for us as a template. FIG. 17D is a perspective view photograph of the resulting substantially interconnected vascular network showing a scale bar=5 mm. FIGS. 17E and 17F are photographs depicting the top view and a side view, respectively, of the same vascular network, with scale bars=5 mm.

Upon close inspection, it can clearly be seen that the two entangled filament networks in FIGS. 17A-F could not be fabricated separately via SLS and then entangled immediately prior to solidification of the matrix material. Instead, the two entangled filament networks of FIGS. 17A-F were co-fabricated via SLS in a form approximately equivalent to their final form within the solid matrix material. In particular, FIG. 17B shows two entangled filament networks simultaneously fabricated via SLS according to embodiments of this disclosure. The as-fabricated filament networks in FIG. 17B mirror the final arrangement of the interconnected vascular network prior to introduction or solidification of the matrix material.

Model Tissues Fabricated Via STS-CaST, According to Embodiments

FIGS. 18A-18B and 19A-19B depict an interconnected vascular network fabricated via SLS-CaST from an extra cellular matrix (ECM) material that contains living cells, according to one or more embodiments of this disclosure. Such an embodiment may be used to assess the metabolic activity of cells within sacrificially-templated model tissues.

Figure 18A:
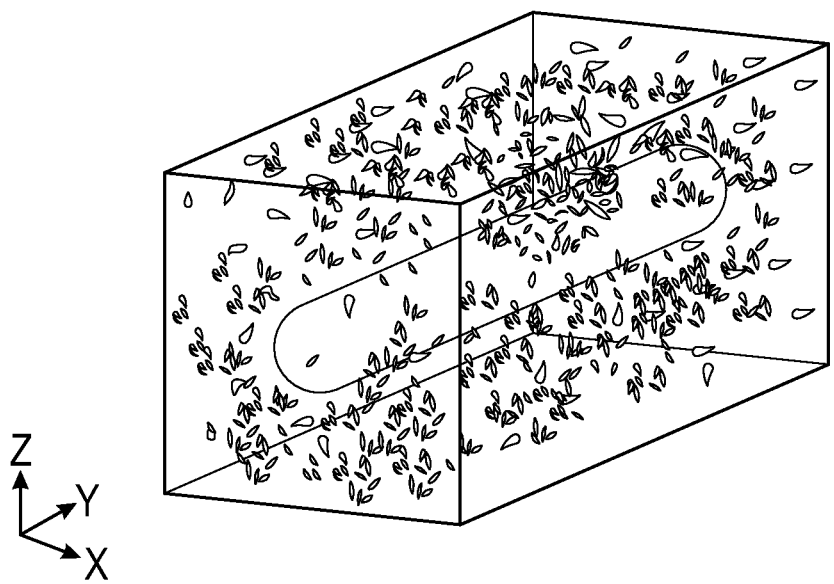
FIGS. 18A and 18B depict an interconnected vascular network, according to one or more embodiments.
Figure 18B:
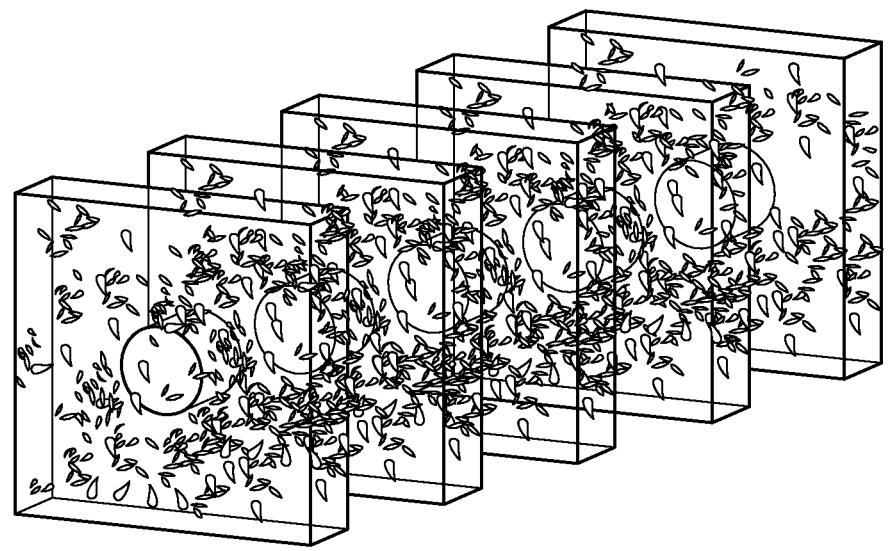
Figure 19A:
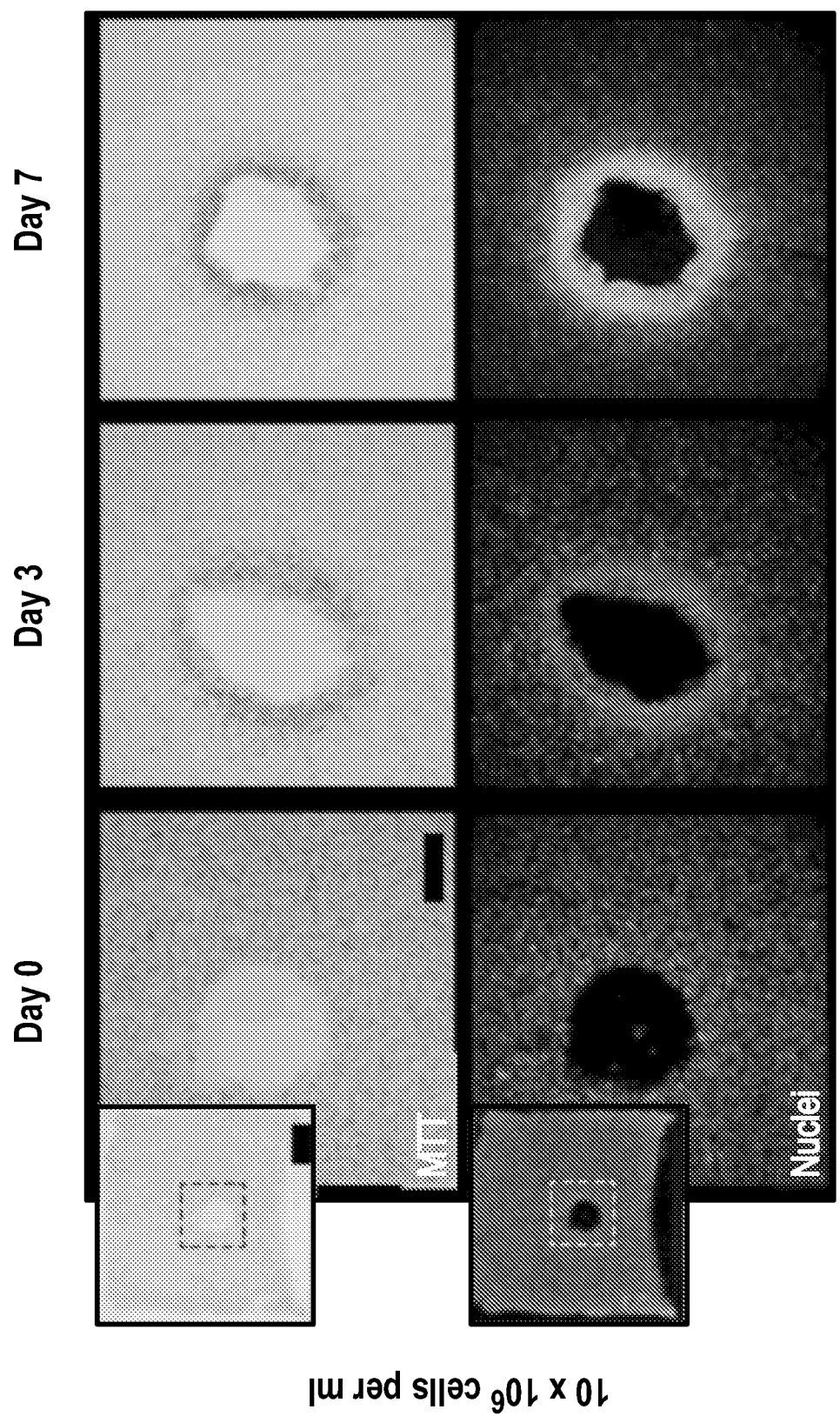
FIGS. 19A and 19B depict an interconnected vascular network, according to one or more embodiments.
Figure 19B:
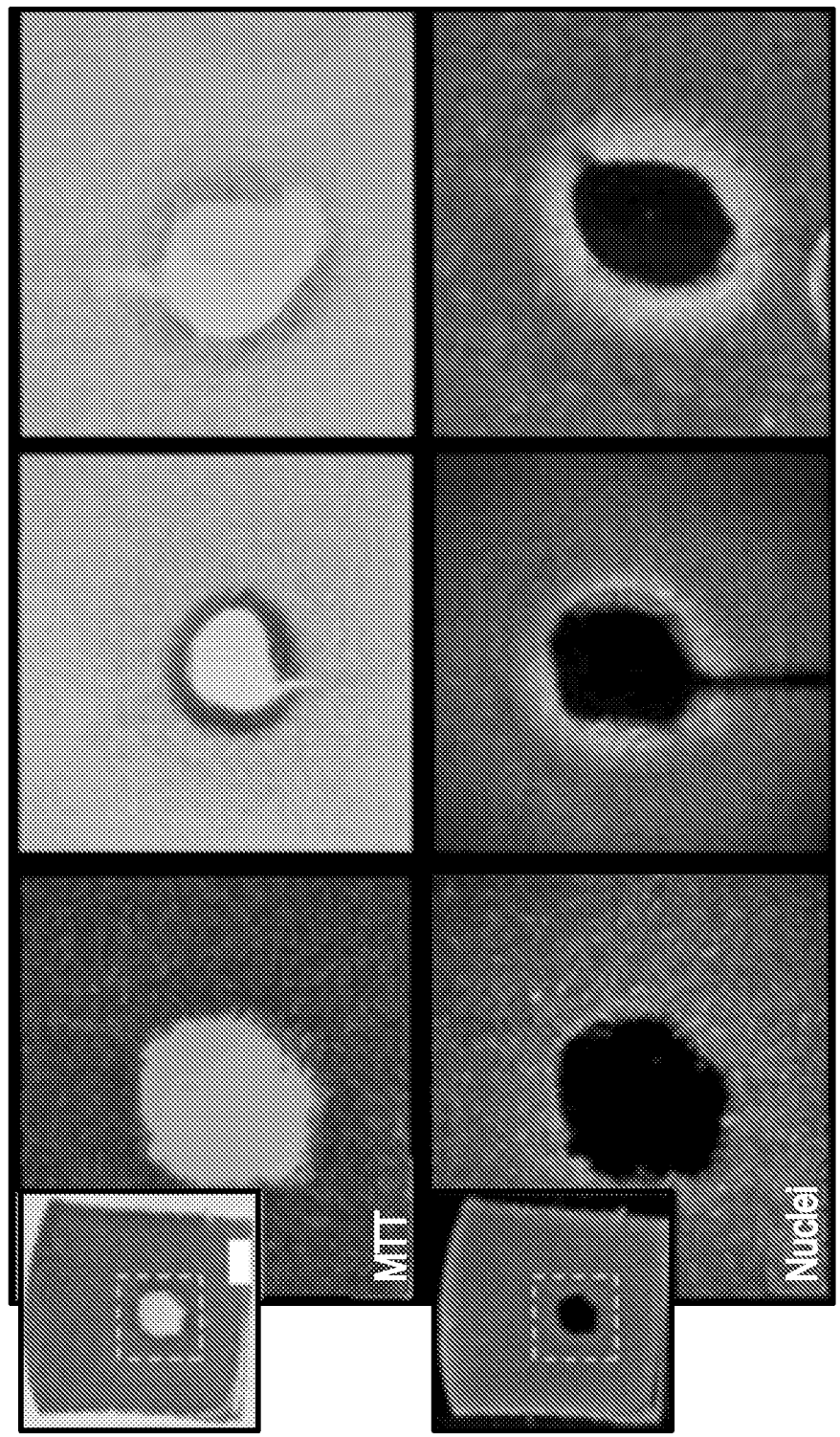

FIG. 18A schematically depicts the vascular network and FIG. 18B schematically depicts the vascular network after being cross-sectioned for staining and imaging. The interconnected vascular network is 6 mm by 15 mm by 6 mm. Prior to optical imaging, the vascular network is cross-sectioned into 300 µm thick slices in the y-direction (parallel to the flow direction), stained, and imaged via optical microscopy as shown in FIGS. 19A and 19B. Cellular staining was performed using 3-(4,5-Dimethylthiazol-2-yl)-2,5-Diphenyltetrazolium Bromide (MTT) and nuclear staining was performed using Nuclear Green™ LCS1.

FIGS. 19A-19B are optical micrographs of two cell-laden vascular networks fabricated using ECM matrix material having a cell density of 10e6 cells per milliliter (cells/mL) (FIG. 19A) and 60e6 cells/mL (FIG. 19B), according to embodiments of this disclosure.

Each sample was images after perfusion with cellular medium at 0 days, 3 days, and 7 days. Thus, as time elapses, FIGS. 19A-19B show development of a characteristic annular region of highly active cells near the channel. The insets at day 0 show the entire cross-section with a dashed line indicating the location of the magnified regions.

The purple signal displayed in each figure reflects a formazan precipitate that was formed when living cells actively metabolize the compound 3-(4,5-Dimethylthiazol-2-yl)-2,5-Diphenyltetrazolium Bromide (MTT).

In view of the above, one-step casting of the entire ECM, via SLS-CaST as described in embodiments of this disclosure, may eliminate the need for time-intensive cell/ECM printing, allow non-specialists in tissue fabrication to perform experiments with patterned vascular networks, and facilitate experiments with a wider range of cells, aggregates, and organoids. Indeed, cells which are intolerant to extrusion and/or which benefit from culture in aggregates may be successfully incorporated into vascularized model tissues using SLS-CaST according to one or more embodiments described herein. Moreover, one or more embodiments herein may decouple fabrication of vascular architecture from experimental design and may offer the user unconstrained access to the entire remarkable palette of biomaterials developed over the past decades.

Computational Design of Artificial Vasculature, According to Embodiments

To design biomimetic vascular networks with tunable vessel topologies, one may employ a mathematical model of leaf venation to computationally grow branched vascular networks as disclosed herein. Networks modeled thusly may then be produced via an SLS-CaST method according to one or more embodiments. The leading hypothesis for the formation of leaf veins is the auxin canalization theory, which describes the differentiation of veins as a feedback loop between flow of the hormone auxin and the expression of veins. Space colonization algorithms inspired by auxin canalization have been previously elaborated for parametric tree growth. To better model natural vasculature, a modeling framework called Mutual Tree Attraction was developed to generate branched three-dimensional networks with a single inlet and a single outlet. FIGS. 20A-20D illustrate the mutual tree attraction for computationally growing dendritic vascular networks, according to one or more embodiments. Specifically, FIGS. 20A-20D depict a schematic of algorithmic growth of dendritic vascular networks with a 2D architecture via mutual tree attraction, according to one or more embodiments of this disclosure.

In one or more embodiments, the mutual tree attraction method, as schematically depicted in FIGS. 20A-20D, may include: instantiating a two-dimensional or three-dimensional growth domain wherein the dendritic network will be generated, and instantiating two or more seed nodes to serve as the beginning points for generating a sequence of connected nodes; computing the positions of a sequence of nodes and edges, beginning with the seed nodes, such that they are connected in a biomimetic, branched tree-like morphology; forming a closed branched network (a dendritic network) by the connection of terminal nodes from each node tree; and forming a three-dimensional model of a dendritic vascular network by generating cylindrical filaments following the node tree. In some embodiments, the method of computationally generating dendritic vascular networks discussed here may generate the architecture of the dendritic network for an interconnected vascular network formed via an SLS-CaST method as discussed above.

Figure 20A:
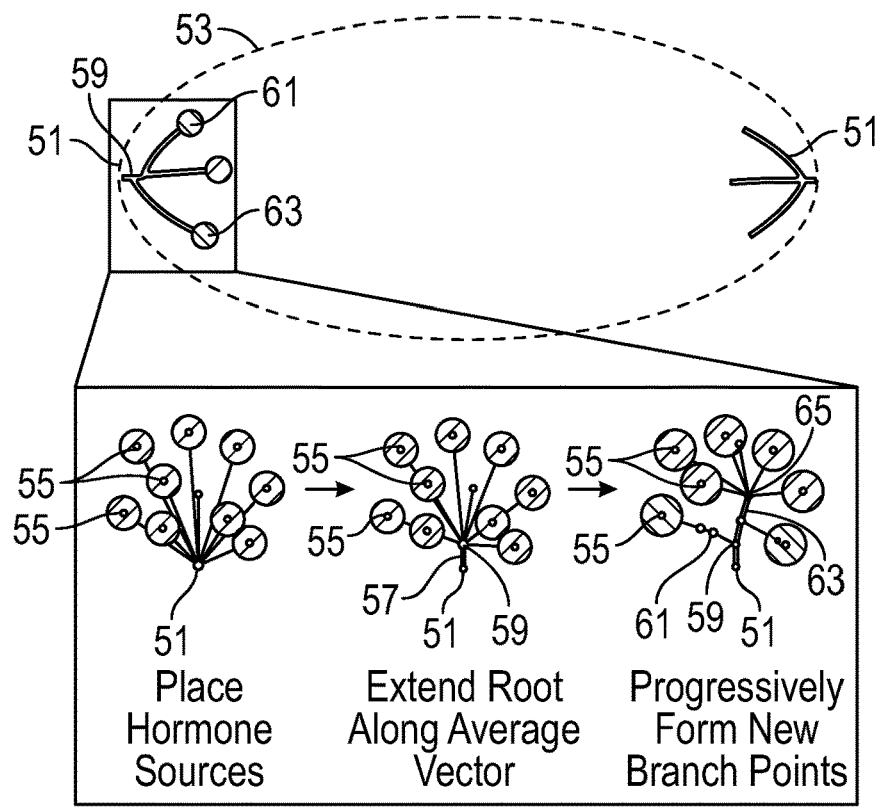
FIGS. 20A-20D depict embodiments of a mutual tree attraction method.

In some embodiments, virtual hormone sources stochastically may be placed within a two-dimensional or a three-dimensional growth domain and influence the growth path and branching behavior of a series of nodes which originate at the inlet and outlet. Thus, each seed node may become the root of a branched tree of nodes, according to one or more embodiments. Through a series of discrete time steps, each seed point, representing an inlet or outlet, becomes the root of a branched tree of nodes that fills the growth domain, as described elsewhere. In some embodiments, the branching morphology may be tuned by adjusting the hormone source density and the attractive influence of a hormone source, which decays with distance. In FIG. 20A, two seed nodes 51 are located within an elliptical growth domain 53. The first inset schematic shows an attractive field of virtual hormone sources 55 within growth domain 53. In the second inset schematic, a root 57 is extended along the average vector between a node 51 (here, the seed node) and virtual hormone sources 55, forming a second node 59. Node 59 is a branch point formed as multiple nodes are attracted differentially to their respective proximate hormone sources 55.

Figure 20B:
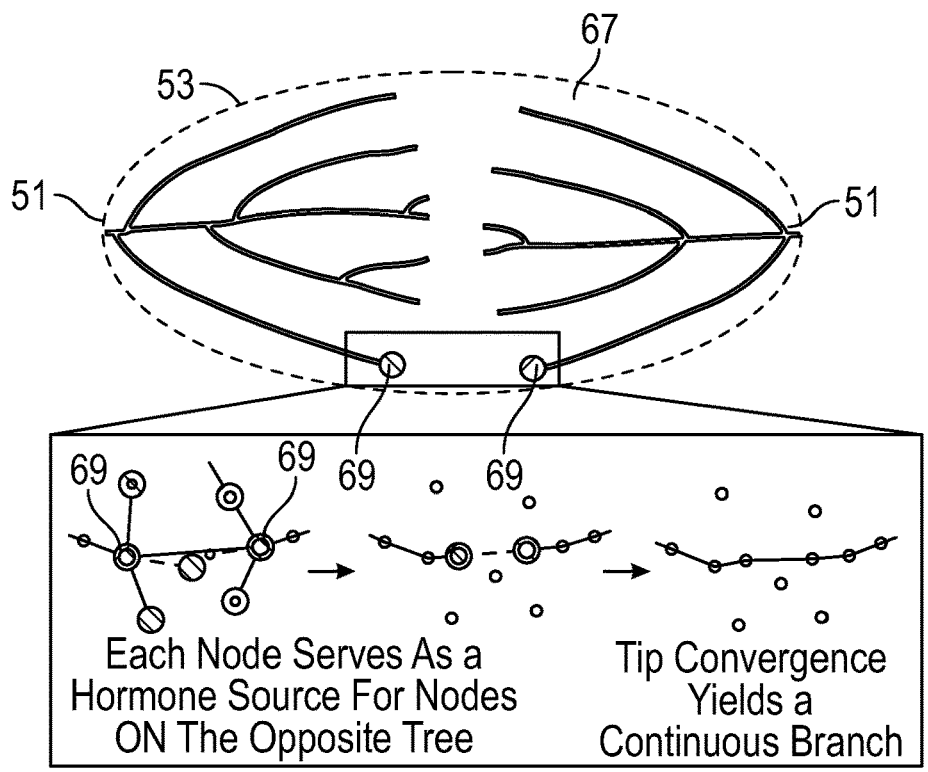

To form a closed architecture, the actively growing branch tips of each tree may behave as additional hormone sources which attract branches of the opposite tree. Thus, the advancing tips of each node tree may behave as additional hormone sources so that, as the two growing trees approach the center of the growth domain, their terminal branches are mutually attracted. FIG. 20B depicts this intermediate stage where each tree grows to approach the other, according to some embodiments of this disclosure. Each node tree includes branches 67 terminated with advancing tips 69. Each node serves as a hormone source for nodes from the opposite tree. Thus, tip convergence yields a continuous branch.

Figure 20C:
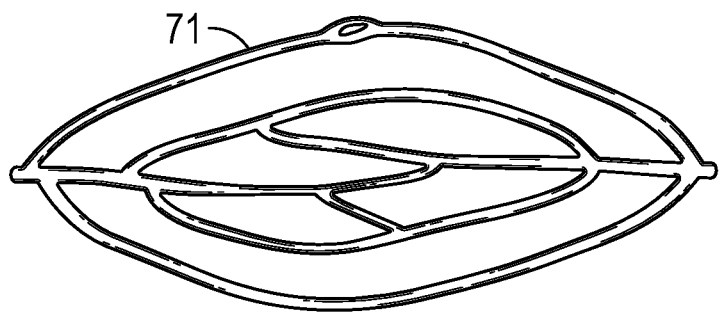

In some embodiments, while hormone sources in the growth domain may influence both advancing trees, tip hormone sources may influence the opposite tree (i.e., self-attraction may be prohibited within a tree). To that end, FIG. 20C shows the state of a network 71 where two trees have converged to form a closed network.

Figure 20D:
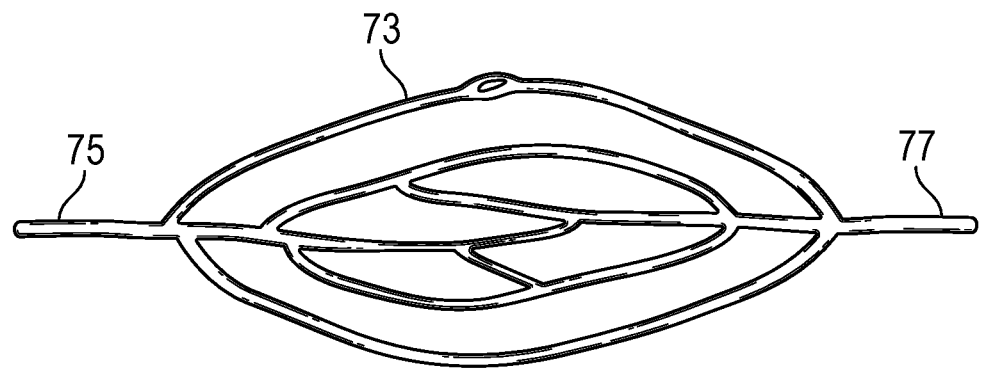

Finally, the set of nodes and edges representing the vascular network may be assigned vessel diameters according to some embodiments. Also, an inlet and outlet may be added. Thus, a three-dimensional model of the architecture compatible with typical digital fabrication toolchains may be formed. Here, FIG. 20D shows an example of a final network 73 produced via this method once vessel thicknesses have been assigned and an inlet 75 and an outlet 77 are added.

Vessel thicknesses may be assigned independently from the network growth step and can be derived from Murray's Law or other theoretical relations, according to one or more embodiments. In one or more embodiments, the dimensions of the filaments may be determined through a mathematical relation, including but not limited to Murray's Law. The completed architectures may be referred to as dendritic networks in recognition of their tree-like morphology, which is reminiscent of natural flow systems ubiquitous in biology and beyond.

Fabrication of Model Mammalian Vasculature Using SLS-CaST, According to Embodiments Referring now to FIGS. 21A-21G, fabrication of an interconnected vascular network in the shape of a filament network made of a plurality of filaments using a template formed via SLS to form channels within a matrix material according to SLS-CaST is illustrated, according to one or more embodiments. Here, FIGS. 21A-21F displays generative dendritic architectures having extensive unsupported branching and filament tapering. In the resulting perforated or patterned matrix, all channels are intact and contiguous.

Figure 21B:
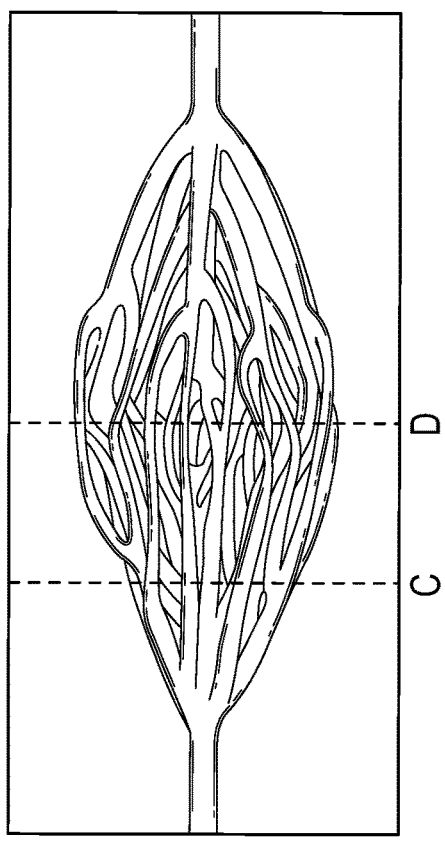
Figure 21D:
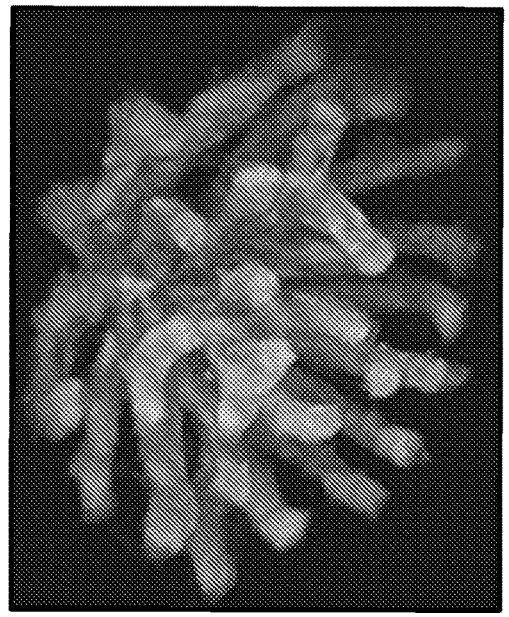
Figure 21A:
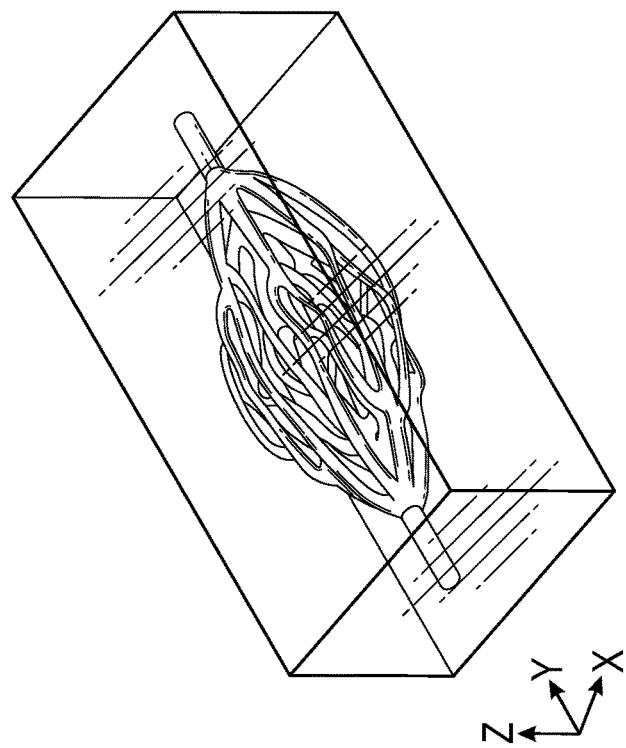

A perspective view schematic of the interconnected vascular network can be seen in FIG. 21A. FIG. 21B is a top-view schematic of the same vascular network indicating planes C and D, where plane C is closer to the inlet and plane D is closer to the center of the vascular network. The interconnected vascular network was computationally modeled within a three-dimensional ellipsoidal domain, according to one or more embodiments.

Figure 21C:
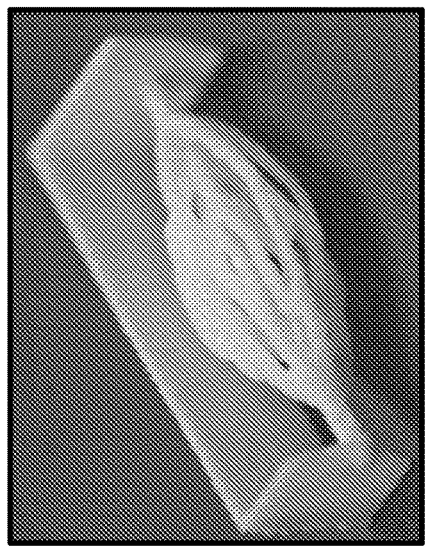

FIG. 21C is a photograph of the template for the interconnected vascular network in the shape of the filament network or a dendritic vascular network schematic shown in FIGS. 21A and 21B (scale bar=10 mm). The interconnected vascular network modeled for FIG. 21A is shown in FIG. 21C upon fabrication using SLS from a powder, according to one or more embodiments. The template for the interconnected vascular network features hierarchical branching between a single inlet and a single outlet into a total of 33 daughter vessels.

FIG. 21D is a micro-Computed Tomography (μCT) cross-section of the template shown in FIG. 21C. FIG. 21D shows the intact nature of the 33 daughter vessels.

FIGS. 21E-21G are photographs of the final interconnected vascular network formed via the sacrificial templating of the dendritic carbohydrate template of FIGS. 21A-21D, according to one or more embodiments. After being formed via SLS-CaST in an agarose hydrogel (2 wt %) according to embodiments of this disclosure, the interconnected vascular network photographed in FIG. 21E (scale bar=10 mm) was patent and was fully perfused with a blue liquid. Cross sections of the completed vascular network shown in in FIGS. 21E and 21F (schematically shown in FIG. 21B as planes C and D, respectively) illustrate fully perfused channels with approximately circular cross-sections within the agarose hydrogel matrix material.

Theoretical and empirical evaluations of fluid convection through final interconnected vascular network of FIGS. 21E and 21F demonstrated that these networks can effectively distribute flow across all of the channel segments across a range of flow rates (Q). Perfusion of a planar dendritic network sacrificially templated in an agarose gel yielded fluid flow through all of the branches. Fluid streams that bifurcate exhibited lower velocity in the daughter branches, whereas converging streams gained velocity as they merge. Parabolic velocity profiles increased in direct proportion to the applied flow rate, as expected for laminar flow of a Newtonian fluid. Moreover, simulating convection through this vascular network using standard computational fluid dynamics (CFD) recapitulated the experimentally observed velocity profiles at the same order of magnitude, indicating that such simulations can offer meaningful predictive insights into the velocity profiles and magnitudes that will develop in dendritic architectures.

Examining the results of three individual particle image velocimetry (PIV) experiments, independent gel replicates exhibited reproducible maximum velocity magnitudes ($v_{max}$) and wall shear stresses (WSS), which increased as expected in direct proportion to the applied flow rate ($Q=\frac{1}{2}\pi R^2 v_{max}$). Computationally predicted values followed the same trend, with somewhat larger magnitudes than experimental values, which may be explained by frictional losses in the microbore tubing used in the experiment. The relatively larger deviation between shear stress values compared with velocity values may be explained by the fact that the shear stress values are computed at the channel edges, where the physical particles are more sparse and more prone to quantification artefacts. The maximum velocities and wall shear stresses were consistent across channels at the same axial distance, indicating evenly distributed fluid flow throughout the network. Furthermore, the volumetric flow rate (and thus the velocity profile) through a particular segment of the network is highly dependent on the local radius ($Q=(\pi\Delta PR^4)/(8\mu L)$), implying that small differences in the original carbohydrate templates may be amplified when recording the velocity in templated networks. Finally, while PIV is only tractable over a regime of relatively low flow rates, these networks can withstand (probably depending on the material) much higher flow rates on the order of tens or hundreds of milliliters per minute. For example, a flow rate of 120 milliliters per minute (mL min$^{-1}$) was well-tolerated by this architecture, which corresponds theoretically to $v_{max}$=1.3×10$^6$ microliters per minute (μL min$^{-1}$) and WSS=148 dynes per square centimeter (dyn cm$^{-2}$) for a region studied near the center of the vascular network. The monolithic nature of these rapidly cast gels may be directly related to this observed capacity to withstand high flow rates because there are no individual layers or extruded filaments of gel that can shear apart or delaminate. Replicate PIV experiments in three independent gels demonstrated reproducible fluid convection (i.e., $v_{max}$) and wall shear stress and followed the theoretically predicted direct proportionality with flow rate.

A larger, more complex dendritic network than FIGS. 21A-21F was generated through mutual tree attraction, fabricated as a carbohydrate template, and cast with a cell-laden agarose gel (25e$^6$ cell mL$^{-1}$, 2 wt %). MTT staining of a section (500 μm thick) from the center of the gel shows patent channels and uniformly distributed metabolically active cells at day 0. Vascular proximity in the center of this dendritic architecture was quantified by segmenting an MTT-stained tissue section and generating a map of distances from each point in the parenchymal space to the nearest vascular channel or outer surface. By representing the map as a histogram and corresponding cumulative distribution function, it was shown that 65% of the tissue volume in the center of this architecture lies within 1 mm of a vessel and 88% of the volume lies within 1.5 mm, suggesting that this architecture can successfully support cells within the viable distance of ~1 mm discussed elsewhere. While smaller vessels and intervessel distances can be readily fabricated via SLS-CaST, this example highlighted the need for vascular network complexity to scale with tissue volume, as well as to introduce new metrics for describing vascular proximity.

Sacrificial Template for a Dendritic Vascular Network, Per One or More Embodiments In particular, SLS of carbohydrate(s), according to one or more embodiments described above, enables the fabrication of templates having architectures not previously accessible, including those with extensive three-dimensional branching and/or unsupported geometries. Thus, one application for SLS of carbohydrate(s), according to one or more embodiments, may be to form sacrificial templates to create interconnected vascular networks within biocompatible matrices. Accordingly, interconnected vascular networks formed via SLS-CaST within biocompatible matrices may take the form of dendritic vascular architectures (such as those described above and depicted in FIGS. 20A-20D and FIGS. 21A-21G), which may include these newly accessible architectural features in order to more accurately mimic biological structures. In view of the above, SLS-CaST may be an excellent methodology for forming engineered model tissues that may mimic native physiology.

In one or more embodiments, a three-dimensional model of the dendritic vascular network may be computationally generated using the mutual tree attraction algorithm described above. Vessel diameters may thus be provided by Murray's Law or another mathematical relation, according to one or more embodiments. Further, an interconnected vascular network having the shape of the computationally-generated dendritic vascular network may be formed within a biocompatible matrix material via SLS-CaST, per one or more embodiments. The SLS-CaST method described here may optionally include surface smoothing and/or surface coating.

Sacrificial Templating of Model Tissue Vasculature with Sintered Carbohydrates, Per One or More Embodiments In one or more embodiments, a vascular network may be created in engineered tissues by forming the engineered tissue around a template of laser-sintered carbohydrates, then selectively removing the template from within the engineered tissue. In one or more embodiments, a template may be solidified via sintering in the shape of the desired interconnected vascular network (e.g., a dendritic network architecture, See Sacrificial Template for a Dendritic Vascular Network, per One or More Embodiments, outlined above), then encased in a matrix material and dissolved away so that the interconnected vascular network may be retained as void space in the matrix material. The matrix material used may be any biocompatible hydrogels or other biomaterials of variable composition, according to one or more embodiments. Immediately after sintering, the template may benefit from additional processing due to its solubility in water. Rapid dissolution of the template in the matrix material with an aqueous component, such as an aqueous pre-polymer, may be avoided by coating the template in a hydrophobic polymer (e.g., polycaprolactone or poly(lactic acid)), according to one or more embodiments. According to one or more embodiments, prior to coating with the hydrophobic polymer, treatment with a smoothing solution may also be performed to smooth a surface of the template. Following surface coating and/or surface treatment and backfilling the template with the matrix material, the template may be dissolved out from the matrix material, according to one or more embodiments. In some embodiments, the matrix material may be a hydrogel (with or without crosslinking) that contains cells. A system formed according to the one or more embodiments described here may be an engineered tissue construct or a model tissue.

Further, embodiments of this disclosure may be applied to create vascular networks in a matrix material containing any hydrogel, wherein that hydrogel may contain any cell type or combination of cell types. Some embodiments may solve the major problem of fabricating vascular topologies in biocompatible materials. For example, embodiments of this disclosure may create engineered tissue constructs that recapitulate the internal architecture of the kidney, liver, pancreas, or lungs and/or contain the appropriate cell type.

Additionally, embodiments may be used to fabricate model systems for scientific research, for example, studies of vascular function and/or disease. For example, simple vascular networks formed using one or more embodiments may serve as a platform for scientific research experiments. Such experiments may examine things like vessel formation and remodeling; angiogenesis; tumor intravasation and extravasation; and atherosclerosis.

Furthermore, various types of model tissues formed according to one or more embodiments of this disclosure may aide in the evaluation of pharmaceuticals including novel pharmaceuticals.

Outside of the field of biofabrication, one or more embodiments of this disclosure may be used for the creation of microfluidic devices. In some embodiments, a silicone matrix may be substituted for the hydrogel used in the biomimetic examples discussed above. Formation of a microfluidic device using a silicone matrix according to embodiments of this disclosure which form channels in a stiff, long-lasting material. One application for a silicone-based microfluidic device, created according to some embodiments, may be the formation of flow phantoms for imaging studies.

Development of Open-Source SLS Hardware, According to Embodiments

An OpenSLS printer (described elsewhere) was modified for compatibility with carbohydrate materials. In brief, commercial $CO_2$ laser cutter was modified by replacing the cutting bed with a custom powder-handling module and overriding the onboard electronics with an open-source 3D printer motherboard (RAMBo v.3.1, Ultimachine) running a customized version of open-source Marlin firmware (https://github.com/MarlinFirmware). The powder-handling module was designed with an 11×13×9 cm build volume and was fabricated primarily using laser-cut acrylic and 3D-printed poly(lactic acid) (Ultimachine) filament. Detailed designs for the powder-handling module components are available at the OpenSLS repository (https://github.com/MillerLabFTW/OpenSLS) along with the bill of materials, wiring diagrams and custom firmware.

3D Model Design and Processing, According to Embodiments 3D models were designed using OpenSCAD (http://openscad.org), Blender (https://blender.org) or with custom generative algorithms. A custom Python add-on for Blender was developed to interactively, parametrically generate hierarchically branched architectures, which was inspired by vessel bifurcation in the natural process of intussusception (https://github.com/MillerLabFTW/IntussuseptionAddon). The DNA helix model in FIG. 8A was created by jharris (https://www.thingiverse.com/thing:412973) and the ash tree model in FIG. 8B was created by dutchmogul (https://www.thingiverse.com/thing:1079821). Three-dimensional models were sliced into G-code using open-source Slic3r software (Slic3r.org). To assign different laser speed and power settings to different regions of a model, each region was assigned to a different extruder within Slic3r. After slicing, G-code was modified using a custom Python script to make it compatible with OpenSLS motor axis assignments and to incorporate the desired speed and power parameters. G-code was sent to the printer via the open-source Pronterface console (github.com/Kliment/Printrun).

Preparation and Laser Sintering of Carbohydrates, According to Embodiments

Isomalt (Decomalt, Paris Gourmet) was ground in a blade coffee grinder (Krups® F203), then strained through no. 35 and 60 mesh sieves (60 mesh=250 μm grid spacing).

Sieved isomalt powder was mixed at a 7:3 ratio by mass with food-grade cornstarch (Argo®), put on a lyophilizer (Labconco®) as a precaution against ambient moisture, and stored at room temperature in an airtight container.

For fabrication, a thin layer of the powdered carbohydrate mixture was manually spread across the build platform on top of a layer of painter's tape.

The appropriate G-code file was initiated in Pronterface to begin layer-by-layer fabrication.

For each layer of a print, solid geometry is patterned by selectively melting the carbohydrate powder with a laser.

Following this patterning step, fresh powder is added for the subsequent layer by shaking a sieve reservoir suspended above the build volume. The shaking motion dislodges powder into a heap on the build platform while aerating it and preventing compaction. Following the dispensing of fresh powder from the suspended reservoir, the heap of powder is spread into an even layer by a counter-rotating roller. Finally, excess powder is removed by a plow mechanism and collected below the powder handling module. The powder may be recycled tens to hundreds of times without a noticeable drop in print quality.

Typical prints used laser translation speeds of 1,000-2,000 mm min$^{-1}$ (16-32 millimeters per second (mm s$^{-1}$)) and power densities of 40-60 W mm$^{-2}$ from a 40 watt (W) laser tube (LightObject).

All carbohydrate structures were fabricated with 150 µm layer height except those shown in FIGS. 8A and 8B, which were fabricated with 250 µm layer height.

During fabrication, nitrogen gas was gently flowed through the laser nosepiece to prevent accumulation of carbohydrate residue on the laser optics and the laser cutter was continually flushed with a steady stream of nitrogen.

After fabrication, excess loose powder was removed with a brush or compressed air and individual filaments were cleaned with a needle.

Characterization of Carbohydrate Powders and Fabricated Parts, According to Embodiments Flow properties of powdered carbohydrates were investigated using a powder rheometer (FT4, Freeman Technology®) using stability and variable flow rate testing protocol. Pure isomalt powder was compared with the isomalt+cornstarch powder as well as to commercial nylon powder (PA650, Advanced Laser Materials). After powder pre-conditioning using the manufacturer's recommended protocol, the resistance to flow was measured across seven cycles in an unconfined geometry with a blade tip speed of 100 mm s$^{-1}$, yielding measurements of specific energy. To compare flow properties between materials, specific energy (in mJ g$^{-1}$) was multiplied by each powder's conditioned bulk density (in grams per milliliter (g ml$^{-1}$)) and reported as mJ ml$^{-1}$.

Scanning electron microscopy was performed to analyze the morphology of powdered materials and characterize the surface properties of sintered parts. Powder grains or pieces of sintered parts were sputter coated with 10 nanometers (nm) gold (Desk V Sputter Coater; Denton Vacuum®) and imaged on a Quanta 400 environmental scanning electron microscope (ESEM) (FEI Company®).

To measure the surface roughness of sintered carbohydrates, scanning electron microscopy micrographs were thresholded and a custom MATLAB® function was used to extract the profile of each edge. Average surface roughness ($R_a$) was computed using the formula:

$$R_a = 1/L \int_0^L Z(x)dx.$$

where $Z(x)$ is the edge profile and L is the length of the edge. The width of sintered filaments was measured in Fiji ImageJ (National Institutes of Health) using photographs acquired on a stereoscopic microscope (SteREO Discovery.V8, Zeiss®) equipped with a digital single-lens reflex (DSLR) camera (EOS 5DSR, Canon®).

Volumetric micro-computed tomography scans of sintered carbohydrates and PCL foams were acquired on a SkyScan™ 1272 x-ray computerized tomography (CT) scanner (Bruker®), using a 50 kilovolt (kV), 200 microamp (µA) x-ray source and exposure duration 424 milliseconds (ms). One-hundred-and-eighty-degree scans were performed in 0.3° increments. Volume reconstruction and visualization were performed using NRecon and CTVox (Bruker®) software, respectively.

Uniaxial compression testing was conducted in accordance with a modified version of ASTM standard D695-02a. Samples were subjected to compressive loading on a mechanical testing system (858 Mini Bionix, MTS), equipped with a 10 kilonewton (kN) load cell. Samples were compressed along their long axes (i.e., the axial direction) with a cross-head displacement rate of 0.5 millimeters per minute (mm min$^{-1}$) following application of a 25 Newton (N) preload.

Carbohydrate Post-Processing and Sacrificial Templating, According to Embodiments Sintered carbohydrates were post-processed by treating with a concentrated isomalt solution. Isomalt was dissolved in boiling deionized water (60 grams (g) isomalt in 100 milliliters (ml) water), cooled to room temperature, filtered (Steriflip®, 0.22 µm polyethersulfone), and stored at room temperature. Sintered carbohydrates were submerged in and out of this solution for 10-20 seconds (s), then excess liquid was removed with a stream of pressurized nitrogen gas or by wicking with a Kimwipe™.

In some embodiments, it may be desirable to add an additional hydrophobic coating to the carbohydrate templates to preserve the carbohydrate architecture while the bulk matrix material is solidified (for example, warm agarose solutions may deform the carbohydrate filament before solidifying completely, especially in large volume gels). Hydrophobic coatings were employed for all example embodiments with agarose gels (FIGS. 12D, 13-17, and 21), as well as for the demonstration gels (FIGS. 12A-12C and 12E-12F). Hydrophobic coating was accomplished by dipping the templates in a solution of PCL (CAPA™ 6500, Perstorp AB®) or poly(lactide-co-glycolide) (AP062, Akina, Inc.) dissolved in chloroform (Alfa Aesar™; 10-25 mg ml$^{-1}$). Excess coating was removed with pressurized nitrogen gas and the coated template was allowed to dry for 5 min.

In some embodiments, it may be desirable to exclude a hydrophobic coating to the carbohydrate templates. Uncoated templates were used for experiments with endothelial cell seeding and spatial patterning (FIGS. 18A-19B and 19A-19B).

Carbohydrate templates designated for sacrificial templating were adhered to glass slides by dispensing additional PCL solution (100 mg ml$^{-1}$ in chloroform) along the interface between the template and the glass and allowing the solvent to evaporate.

In typical sacrificial templating experiments, pre-polymer was dispensed via pipette around a carbohydrate template after post-processing as described above.

In FIG. 12A, PCL foams were prepared by forming a slurry of sodium chloride crystals in PCL solution (40 wt % in chloroform), then dispensing this slurry around a carbohydrate template and allowing overnight solvent evaporation. In FIG. 12B, PDMS (Sylgard™ 184, Dow Corning®) was prepared by dispensing a 10:1 base:catalyst mixture around a carbohydrate template and curing for 48 hours (h).

In FIG. 12C, photopolymerized PEGDA and gelatin methacryloyl (GelMA) hydrogels were prepared by dispensing a mixture of PEGDA (6 kDa, 20 wt %; synthesized as reported elsewhere) or GelMA (10 wt %; synthesized as reported elsewhere) and photoinitiator (Irgacure® 2959, 0.05 wt %; Ciba®) around a carbohydrate template and photopolymerizing for 30-60 s (100 megawatt per square centimeter (mW cm$^{-2}$), 320-500 nm; Omnicure® S2000).

In FIG. 12D, agarose hydrogels were prepared by dispensing a solution of low-melt agarose (2 wt %; Gold Biotechnology®), heated to 60° C. then cooled to 37-42° C., around a carbohydrate template, then cooling to 4° C.

In FIG. 12E, silk fibroin hydrogels were prepared by mixing aqueous silk solution (4-8 wt %; a gift from Dr. David L. Kaplan, prepared as reported elsewhere) with 10 units per milliliter (U ml$^{-1}$) horseradish peroxidase and 10 microliters per milliliter (μL mL$^{-1}$) hydrogen peroxide (165 millimolar (mM); VWR Chemicals BDH®), dispensing around a carbohydrate template, and polymerizing for 10 minutes (min) at 37° C.

In FIG. 12F, fibrin hydrogels were prepared by dispensing a mixture of fibrinogen (20 milligrams per milliliter (mg ml$^{-1}$); Sigma-Aldrich®) and thrombin (50 U ml$^{-1}$; Sigma-Aldrich®) around a carbohydrate template and polymerizing for 10 min at 37° C.

For all bulk materials, carbohydrate templates were sacrificed (dissolved away) by incubation in deionized water or PBS, assisted by gently flushing through the channels with a syringe.

PCL foams were subsequently frozen and lyophilized.

Sacrificially templated channels were visualized by perfusion either with Microfil® silicone injection compound or colloidal ink suspended in a gel. Microfil® (Flow Tech) was prepared by mixing color base, diluent, and curing agent (4, 5, and 0.45 ml, respectively), pre-curing for 30 min, then perfusing through channels over a period of 10 min using a syringe pump until sufficiently cured. Ink suspension was formed by mixing india ink (between 10 and 100 μL mL$^{-1}$) with PEGDA (3.4 kDa, 20 wt %) and photoinitiator (Irgacure 2959; 0.05 wt %) or with agarose (2 wt %). This suspension was perfused through channels via syringe and photopolymerized (60-120 s at various rotation angles, 100 mW cm$^{-2}$) or cooled while inside the channels. Carbohydrate templates and sacrificially templated materials were photographed using a DSLR camera, with hydrogels submerged in water for photography.

Preparation of Cell-Laden Gels, According to Embodiments
Agarose Gels with HepG2 Cells, According to Embodiments HepG2 hepatoblastoma cells (ATCC) were grown in Dulbecco's modified Eagle's medium (DMEM, 4.5 g L-1 glucose; Corning®) supplemented with 10% fetal bovine serum (FBS) (Atlanta Biologicals™), 1% penicillin/streptomycin (Life Technologies™) and 1× non-essential amino acids (Caisson Laboratories, Inc.).

Cell-laden agarose gels were prepared by resuspending the appropriate number of cells in complete media to half the desired gel volume.

This cell suspension was combined with an equal volume of sterile low-melt agarose (4 wt % in PBS, heated to 60° C., then cooled to 37-42° C. before mixing with cells).

The cell suspension and agarose were vigorously mixed for approximately 60 seconds using a positive displacement pipettor (Microman® E, Gilson™) prior to dispensing around a carbohydrate template and cooling to 4° C. for 5-10 minutes.

The carbohydrate template was removed by incubation in media for 10-15 minutes, assisted by gently flushing through the channels with media via syringe.

Agarose Gels with Primary Hepatocyte Aggregates, According to Embodiments

Hepatocyte/normal human dermal fibroblasts (NHDF) aggregates were harvested, encapsulated in agarose gels, and catheterized in perfusion chambers as described above for HepG2 cells. All experiments used a final cell density of approximately 10e6 hepatocytes mL$^{-1}$ and 5e6 NHDF mL$^{-1}$, and acellular agarose gels ("blank") were cast as negative controls for albumin measurement.

For comparison of static and perfused gels, one set of gels was perfused with hepatocyte culture media at 20 μL min$^{-1}$ with a multichannel peristaltic pump.

A second set of gels was identically catheterized and a 1 mL syringe of hepatocyte media was connected at the inlet and outlet to permit diffusive transport of nutrients into the gel.

For longitudinal albumin measurement, outflow media was collected each from the perfused gels, and the static gels were flushed through with fresh media to capture accumulated albumin.

High density dendritic gels were connected in a flow loop configuration with 50 mL hepatocyte culture media continuously recirculated using a custom designed peristaltic pump at 1 mL min$^{-1}$. Each day, between 10 and 20 mL media was sterilely removed from the flow loop for albumin measurement and replaced with an equal volume of fresh media.

Endothelialized GelMA Gels, According to Embodiments

Human Umbilical Vein Endothelial Cells (HUVEC) green-florescent paint (GFP)-labeled; (Angio-Proteomie; passage 4-7) were grown in complete Vasculife® media (Lifeline® Cell Technologies) supplemented with 1% penicillin/streptomycin. IMR-90 lung fibroblasts (American Type Culture Collection) were grown in F-12K media (American Type Culture Collection) supplemented with 10% FBS and 1% penicillin/streptomycin.

Sacrificially-templated GelMA gels (10 wt %; planar dendritic architecture) were prepared with or without encapsulated IMR-90 fibroblasts (2.5e6 cells mL$^{-1}$) and catheterized inside custom perfusion chambers (as described in the main Methods section) prior to HUVEC injection.

HUVECs were re-suspended to a density of 30e6 mL$^{-1}$ for seeding and slowly injected into the channel via the catheter. To encourage uniform HUVEC adhesion, gels were seeded for six hours at 37° C. and rotated 90 degrees every 15 minutes.

After the seeding period, gels were perfused with complete VascuLife® media (HUVEC-only gels) or a 1:1 mixture of VascuLife®:F12-K media (HUVEC gels with IMR-90). The flow rate was set to 5 μL min$^{-1}$ for the first 24 hours, 10 μL min$^{-1}$ for the next 24 hours, and 20 μL min$^{-1}$ thereafter.

Spatially Patterned Gels, According to Embodiments

GFP-HUVEC and IMR-90 fibroblast cells were cultured as described above. 344SQ murine metastatic lung adenocarcinoma cells were grown in RPMI 1640 media (Corning®) supplemented with 10% FBS and 1% penicillin/streptomycin.

IMR-90 and 344SQ were stably transduced with plasmids encoding H2B-mOrange2 and H2B-mVenus, respectively, using second-generation lentivirus in accordance with Rice University Institutional Biosafety Committee oversight on Protocol 662023.

344SQ aggregates were formed as detailed elsewhere; briefly, laser-ablated PDMS microwells were passivated with a Pluronic F-127 solution (5 wt %) and seeded with 200 cells per well using gentle centrifugation (200×g). After overnight aggregation at 37° C., aggregates were harvested with gentle pipetting and loose cells were discarded by filtering through a 40 μm cell strainer.

Carbohydrate templates were prepared for casting of spatially patterned gels by adhering one open face to a glass slide and stretching Parafilm® over the opposite open face, leaving a small gap through which pre-polymers could be pipetted. The appropriate combinations of cells or beads (10 μm green, red, and blue fluorescent polystyrene beads; MagSphere) were suspended in the appropriate hydrogel pre-polymers and pipetted sequentially into the volume of the carbohydrate template.

GelMA-containing gel regions were partially photopolymerized (5 second light exposure) immediately after pipetting and photopolymerization was completed (30 second exposure each side) after the full construct was cast.

Following photopolymerization, gels were incubated at 37° C. to completely crosslink fibrin gels. Gels were catheterized in perfusion chambers as described above and perfused with complete VascuLife® media (5 µL min$^{-1}$).

Preparation and Perfusion of Cell-Laden Gels, According to Embodiments

Gels sacrificially templated as described above were prepared for multiday perfusion culture by catheterization inside a custom designed perfusion chamber cassette.

In general, the volume of the perfusion chamber was formed either from non-flowing PDMS (SE 1700; Dow Corning®) extruded directly onto a glass slide using a custom pneumatic extrusion printer (haps://github.com/MillerLabFTW/ShopBot-PDMS-Printer) or from 3D-printed poly(lactic acid) with a molded PDMS gasket insert.

Each gel was placed inside a perfusion chamber and catheterized with intravenous cannula catheters (between 14 and 22 gauge, depending on vascular network architecture) or flexible blunt luer tips between 15 and 20 gauge (Nordson Electron Fusion Devices).

In experiments with agarose gels, to prevent the catheters from damaging or slipping out of the channels, the gel was immobilized by dispensing additional acellular agarose to fill the entire perfusion chamber. After this additional agarose solidified, the perfusion cassette was assembled by capping the chamber with a glass slide and tightening screws to secure the assembly.

Endothelialized gels and gels with simple vascular networks were connected in a straight flow path where complete medium was pumped from a syringe or media bag, through a sterile filter (0.22 µm polyethersulfone), through the gel, and into a waste container. The various components of the flow path were connected using silicone microbore tubing (Tygon®, Cole-Parmer®).

Medium was pumped at a flow rate of 25 L min$^{-1}$ using either syringe pumps (NE-300; New Era Pump Systems™) or a multichannel peristaltic pump (Ismatec™, Cole-Parmer®).

Dendritic cell-laden gels were connected in a flow loop configuration. For HepG2 flow loop perfusion (FIG. 6), 150 ml complete medium was continuously cycled with a peristaltic pump (Ismatec™) at 500 L min$^{-1}$ between the gel and a PYREX® bottle flushed with air.

For flow loop perfusion with longitudinal functional monitoring, a flow loop design was adopted that allowed recirculating media to be sampled and replenished. An approximately constant volume of 50 mL was recirculated using a custom peristaltic pump; 20 mL was removed each day through a one-way sampling valve and this volume was replenished from a connected intravenous bag.

Flow-Loop Perfusion of Gels Patterned with Dendritic Vascular Networks, According to Embodiments Gels with dendritic networks were perfused in a flow loop using a peristaltic pump at a flow rate of approximately 500 µL min$^{-1}$. Orienting the gel vertically improved the perfusion of channels throughout the architecture as compared to horizontally-oriented gels. A gradient in phenol red color across the gel shows the relative metabolite exchange available throughout the gel. Gels were initially cast using phenol red-free media and perfused with media containing phenol red. Just after beginning perfusion, the perfusion media is visible in the channels but diffusion of nutrients and phenol red into the interstitial space is negligible. After 2 days, the components of the perfusion media are able to diffuse throughout the entire gel.

In gels with metabolically active cells, red color is observed in the vicinity of the perfused channel where $CO_2$ can exchange into the channels and be carried away. In contrast, $CO_2$ and metabolic wastes accumulate far from the channels, acidifying the gel and yielding a yellow color. The gel containing no live cells confirmed that the perfusion media will diffuse everywhere in the gel after 2 days, validating that the phenol red gradient is due to differential metabolite exchange rather than incomplete diffusion of the phenol red.

For flow-loop perfusion with longitudinal media sampling, a more advanced apparatus was designed that has a one-way sampling valve and an IV bag containing media which can be added into the flow loop to replenish nutrients.

Immunostaining and Fluorescence Imaging, According to Embodiments

Wide-field fluorescence imaging of endothelialized and spatially patterned gels was performed on a Ti-E inverted microscope (Nikon®) equipped with Zyla™ 4.2 sCMOS camera (Andor® Technology Limited), using a motorized stage to acquire large area scans.

Gel Sectioning and Imaging, According to Embodiments

Before staining, gels were removed from culture and live sectioned into slices on a vibrating microtome (VT1000S, Leica™). For sectioning, gels were adhered to a metal stage with cyanoacrylate glue and submerged in room temperature DMEM (sectioning medium: serum-free, phenol red-free, 1% penicillin/streptomycin). Immediately after sectioning, gel slices were stained with MTT solution to measure metabolic output.

To prepare MTT stock solution, MTT (Bio Basic) was dissolved in PBS (5 mg ml$^{-1}$), sterile filtered and stored at −20° C. MTT staining solution was prepared by mixing equal volumes of thawed stock solution with sectioning medium and added to gel slices until they were entirely submerged.

After 30 min (or 60 min for hypothermic perfusion experiments), MTT staining solution was aspirated and gel slices were fixed in paraformaldehyde (4%; Electron Microscopy Sciences, Inc.) for 30 min.

After fixing, slices were incubated in nuclear stain (3 µL mL$^{-1}$) Nuclear Green™ LCS1; Abcam) and then washed in PBS (3×30 min) before imaging.

Stained gel slices were imaged on a stereoscopic microscope (SteREO Discovery.V8; Zeiss™) equipped with a DSLR camera (EOS 5DSR; Canon®).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed as new and desired to be protected by Letters Patent of the United States is:

1. A composition useful in forming a structure comprising a substantially interconnected vascular network, the composition comprising a powder including a carbohydrate powder and an optional anti-caking agent, wherein the powder:

has a granular form, and has a specific energy (mJ/g) multiplied by the powder's conditioned bulk density (g/mL) of less than 6 millijoules per milliliter (mJ/mL).

2. The composition of claim 1, wherein the carbohydrate powder comprises at least one of dextran or isomalt.

3. The composition of claim 1, wherein the anti-caking agent comprises at least one of cornstarch, silicon dioxide, or xanthan gum.

4. The composition of claim 1, wherein:
the powder is configured to be a free-flowing powder, and
the powder has a maximum particle size of 250 micrometers (μm) or less.

5. A three-dimensional structure comprising the composition of claim 1.

6. The three-dimensional structure of claim 5, further comprising a surface coating comprising a hydrophobic polymer.

7. The three-dimensional structure of claim 5, wherein the powder has been fused together into a solid, contiguous filament using a laser.

8. The three-dimensional structure of claim 5, wherein the powder has been fused together into a solid, filament network using a laser.

9. The three-dimensional structure of claim 5, wherein the structure has undergone a surface smoothing using a smoothing solution.

10. The three-dimensional structure of claim 5, wherein a smoothed structure has been subsequently coated in a hydrophobic polymer.

* * * * *